US011528913B1

(12) United States Patent
Deemter

(10) Patent No.: US 11,528,913 B1
(45) Date of Patent: Dec. 20, 2022

(54) AUTOMATED FOOD PREPARATION APPARATUS

(71) Applicant: Kent Deemter, Hudsonville, MI (US)

(72) Inventor: Kent Deemter, Hudsonville, MI (US)

(73) Assignee: Kent Deemter, Hudsonville, MI (US)

( * ) Notice: Subject to any disclaimer, the term of this patent is extended or adjusted under 35 U.S.C. 154(b) by 494 days.

(21) Appl. No.: 16/273,410

(22) Filed: Feb. 12, 2019

Related U.S. Application Data

(60) Provisional application No. 62/629,836, filed on Feb. 13, 2018.

(51) Int. Cl.
| | |
|---|---|
| *A21C 15/00* | (2006.01) |
| *A21D 13/24* | (2017.01) |
| *B26D 7/34* | (2006.01) |
| *B26D 3/30* | (2006.01) |
| *A47J 9/00* | (2006.01) |
| *A47J 43/00* | (2006.01) |

(52) U.S. Cl.
CPC ............ *A21C 15/002* (2013.01); *A21D 13/24* (2017.01); *A47J 9/001* (2013.01); *A47J 43/00* (2013.01); *B26D 3/30* (2013.01); *B26D 7/34* (2013.01); *B26D 2210/06* (2013.01)

(58) Field of Classification Search
CPC .. A47J 31/46; A47J 31/40; A47J 9/001; A47J 43/283; A47J 44/00; A47J 44/02; A21C 15/002; B67D 1/00; A21D 13/24; B26D 3/30; B26D 7/27; B26D 7/32; B26D 7/327; B26D 7/34; B26D 2210/02; B26D 2210/06; B25J 5/00; B25J 5/005; B25J 5/02; B25J 9/0003; B25J 9/10; B25J 9/1005; B25J 9/109; B25J 9/16; B25J 11/0045; B25J 15/0014; B25J 15/0071; B25J 15/0253–0293; B25J 15/08–106; B65G 47/90; B65G 47/904; B65G 2201/0202; B65G 2201/022; B65G 57/005; B65G 57/18; B65G 61/00; B65B 5/105; B65B 35/36; B65B 35/16
USPC ...................... 426/289, 518; 99/450.1–450.7
See application file for complete search history.

(56) References Cited

U.S. PATENT DOCUMENTS

| | | | | |
|---|---|---|---|---|
| 3,670,642 A | * | 6/1972 | Bergman | ............ A47J 37/0814 99/329 RT |
| 8,430,006 B2 | * | 4/2013 | Stanojevic | ............. B26D 1/553 83/281 |

(Continued)

FOREIGN PATENT DOCUMENTS

| | | | | |
|---|---|---|---|---|
| CN | 203354375 U | * | 12/2013 | |
| WO | WO-2010105831 A1 | * | 9/2010 | .......... B25J 11/0045 |

*Primary Examiner* — Drew E Becker
*Assistant Examiner* — Austin Parker Taylor
(74) *Attorney, Agent, or Firm* — The Watson IP Group, PLC; Jovan N. Jovanovic

(57) ABSTRACT

An automated food preparation apparatus configured to provide a completed provision, such as a bagel, optionally toasted, and optionally with a spread. The automated food preparation system includes a food placement and pickup station, a cutting station assembly, a toasting station assembly and a spread applying station assembly. The provision is directed between the station assemblies through a grasping, locating and moving system. The system includes a plurality of food engaging forks that are configured to releasably grasp the food preparation, and, in turn, to locate and move the food preparation therethrough.

17 Claims, 19 Drawing Sheets

(56) References Cited

U.S. PATENT DOCUMENTS

| | | | |
|---|---|---|---|
| 2004/0194639 A1* | 10/2004 | Ilch | B25J 11/0045 |
| | | | 99/450.6 |
| 2005/0193901 A1* | 9/2005 | Buehler | A47J 44/00 |
| | | | 99/468 |
| 2007/0290516 A1* | 12/2007 | Buljo | A22C 17/0093 |
| | | | 294/61 |
| 2011/0209661 A1* | 9/2011 | Fritz-Jung | A21C 9/04 |
| | | | 118/696 |
| 2012/0024170 A1* | 2/2012 | Fritz-Jung | B25J 11/00 |
| | | | 99/450.1 |
| 2016/0176561 A1* | 6/2016 | Findlay | B65G 47/90 |
| | | | 53/235 |
| 2017/0050332 A1* | 2/2017 | Bauer | B26D 7/30 |
| 2017/0072567 A1* | 3/2017 | Carter | B25J 9/1692 |
| 2017/0113368 A1* | 4/2017 | Schmeiser | B26D 7/01 |
| 2017/0225341 A1* | 8/2017 | Kerestes | B25J 15/0491 |
| 2017/0265392 A1* | 9/2017 | Van De Vegte | A01G 18/70 |

* cited by examiner

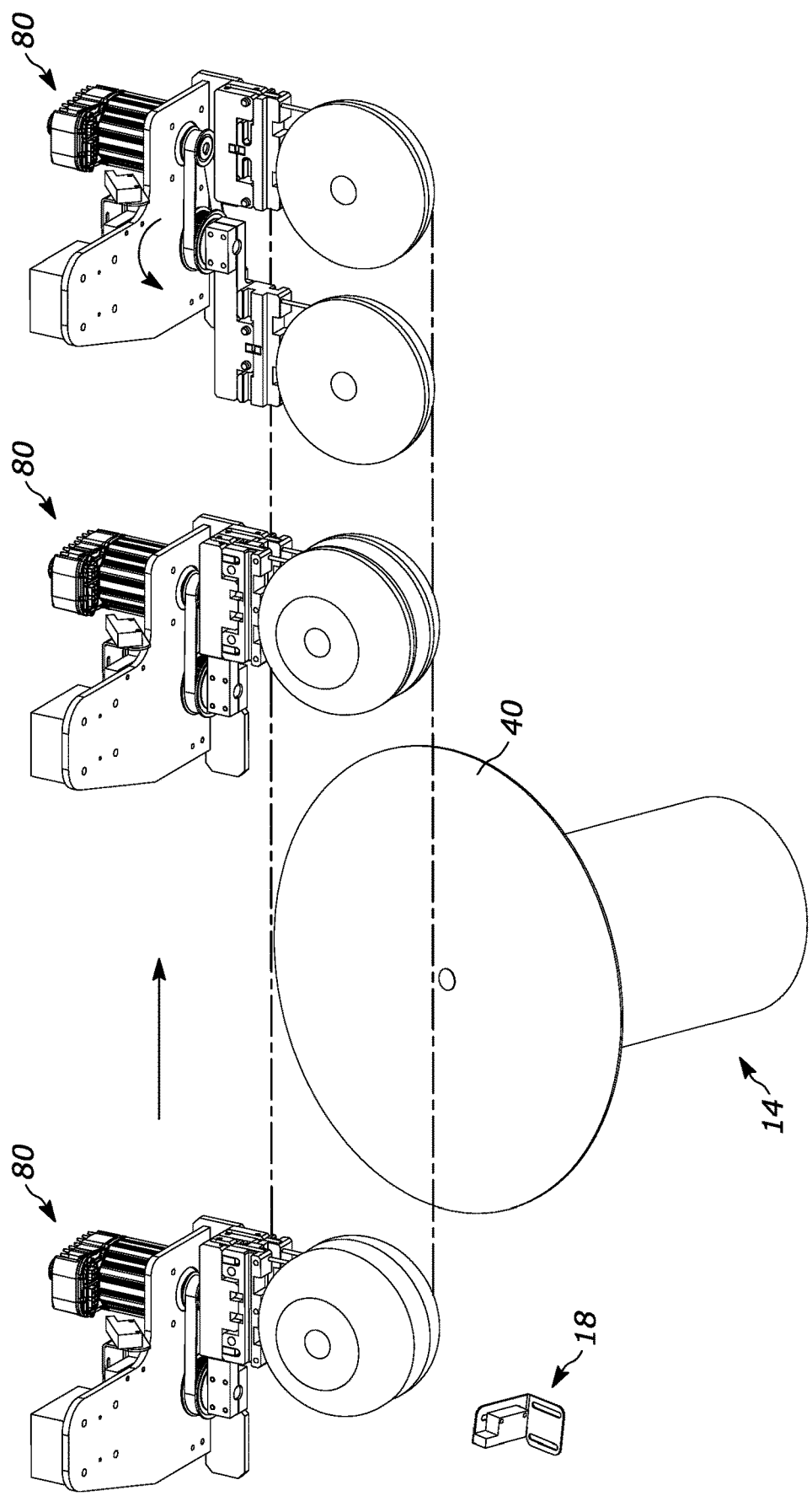

AUTOMATED FOOD PREPARATION APPARATUS

CROSS-REFERENCE TO RELATED APPLICATION

This application claims priority from U.S. Pat. App. Ser. No. 62/629,836, filed Feb. 13, 2018, entitled "Automated Food Preparation Apparatus", the entire specification of which is hereby incorporated by reference in its entirety.

BACKGROUND OF THE DISCLOSURE

1. Field of the Disclosure

The disclosure relates in general to automation equipment, and more particularly, to an automated food preparation apparatus.

2. Background Art

The increase cost of labor and the human cost of injury has led the drive for the automation of tasks that are dangerous, prone to error and/or costly in terms of labor. One sector where automation would be beneficial is in the food preparation sector. Generally, food preparation is prone to errors, can be dangerous to the user (i.e., sharp objects), or the consumer (food poisoning) and can be highly labor intensive.

Problematically, one area where automation has not taken hold is in the food preparation sector. That is, most sandwiches, and other such provisions (bagels, etc.) remain assembled by hand by a user. Such hand assembly is prone to errors, in that some ingredients are forgotten, whereas other non-ordered ingredients are utilized. Additionally, it is often the case that a knife is required in the preparation, which, inevitably leads to injuries over time and repeated use. Finally, assembly of some sandwiches and such provisions such as bagels require multiple repetitive steps for completion.

Another problem that generally precludes automation is the variation in the size of the bread, bagel or other pastry product that forms the outside of the sandwich. As such, it is difficult to properly cut the pastry product as required for the making of a sandwich on a repetitive basis.

SUMMARY OF THE DISCLOSURE

The disclosure is directed to an automated food preparation apparatus configured to provide a completed provision, such as a bagel, optionally toasted, and optionally with a spread. The automated food preparation system includes a food placement and pickup station, a cutting station assembly, a toasting station assembly and a spread applying station assembly. It will be understood that in some configurations, some of the station assemblies can be omitted, and other stations not identified herein may be added or substituted.

In the configuration contemplated, the provision is directed between the station assemblies through a grasping, locating and moving system. The system includes a plurality of food engaging forks that are configured to releasably grasp the food preparation, and, in turn, to locate and move the food preparation therethrough.

As specified and defined below, the term provision, sandwich, bagel and the like are used interchangeably and are utilized for purposes of example. The disclosure is not limited to any particular foodstuff, provision, grain based product, or the like. Essentially, there is not a limitation on the particular type of food that can be utilized within the apparatus, and the use of a bagel in the description is for exemplary purposes, solely.

In an aspect of the disclosure, the disclosure is directed to an automated food preparation station comprising, one of a food placement and a food pickup station, a cutting station assembly, and a grasping system. The one of a food placement and a food pickup station are structurally configured to provide at least one of ingress into and egress from a housing. The cutting station assembly has a cutting blade. The cutting station is positioned within the housing. The grasping system is positioned within the housing and includes first and second food engaging forks, and a carrier. The first food engaging fork has a central body and a plurality of fork prongs extending from the central body. The second food engaging fork has a central body and a plurality of fork prongs extending from the central body. The carrier includes a first fork coupling and a second fork coupling. The first fork coupling and the second fork coupling are structurally configured to move together with the carrier. In such a configuration, at least one of the first fork coupling and the second fork coupling is able to pivot relative to the other of the first fork coupling and the second fork coupling.

In some configurations, the carrier further includes a fork pivoting assembly, defining a fork pivot axis. The first fork coupling is fixedly coupled to the fork pivot axis, so that the first fork coupling can pivot about the fork pivot axis.

In some configuration, the first fork coupling is structurally configured to pivot between a first orientation where the first food engaging fork and the second food engaging fork are positioned in a side by side configuration defining a first open configuration and a second orientation wherein the first food engaging fork and the second food engaging fork are positioned in a stacked orientation defining a second closed configuration.

In some configurations, the plurality of fork prongs of the first food engaging fork and the plurality of prongs of the second food engaging fork are substantially parallel to each other in the second closed configuration.

In some configurations, the plurality of fork prongs of the first food engaging fork and the plurality of prongs of the second food engaging fork are substantially co planar with each other in the first open configuration.

In some configurations, the first food engaging fork is configured to pivot through approximately 180° between the first open configuration and the second closed configuration.

In some configurations, the first food engaging fork is configured to pivot relative to the second food engaging fork so as to remain spaced apart from each other in a stacked orientation than when in the second closed configuration, to define a third loaded configuration.

In some configurations, the carrier is configured to move within the housing between the at least one of a food placement and food pickup station and the cutting station assembly.

In some configurations, the carrier is configured to translate across the cutting station assembly. The cutting station assembly has a cutting blade. In the second closed configuration, the carrier translates across the cutting station so that the cutting blade proceeds between the first food engaging fork and the second food engaging fork.

In some configurations, the cutting blade is positionable so as to be substantially parallel to each of the fork prongs of the first food engaging fork and the second food engaging fork.

In some configurations, the cutting blade rotates about an axis that is fixed to the housing, with the carrier configured to move relative thereto.

In some configurations, the first food engaging fork and the second food engaging fork are releasably attachable to the carrier.

In some configurations, the carrier includes a first fork coupling and a second fork coupling, each comprising a plurality of axial prongs with mating magnets.

In some configurations, the central body of the first food engaging fork has a different configuration than the central body of the second food engaging fork.

In some configurations, a plurality of first food engaging forks and a plurality of second food engaging forks are disposed within the housing and releasably attachable to the carrier of the grasping system.

In some configurations, the automated food preparation system further comprises a toasting station. The toasting station is structurally configured to receive the first food engaging fork and the second food engaging fork when positioned in the first open configuration.

In some configurations, the automated food preparation system further includes a spread applying station. The spread applying station includes a spread dispensing tube having at least one opening. In such a configuration, the carrier can be positioned relative to the spread applying station in an orientation wherein the at least one opening can be oriented proximate one of the first food engaging fork and the second food engaging fork in the first open configuration.

In another aspect of the disclosure, the disclosure is directed to a grasping system within a housing of an automated food preparation station. The grasping system has a first food engaging fork, a second food engaging fork and a carrier. The first food engaging fork has a central body and a plurality of fork prongs extending from the central body. The second food engaging fork has a central body and a plurality of fork prongs extending from the central body. The carrier includes a first fork coupling and a second fork coupling. The first fork coupling and the second fork coupling are structurally configured to move together with the carrier, with at least one of the first fork coupling and the second fork coupling being able to pivot relative to the other of the first fork coupling and the second fork coupling.

In some configurations, one of the first fork coupling and the second fork coupling is removably fixed to the carrier.

In another aspect of the disclosure, the disclosure is directed to a method of grasping a bread comprising the steps of: providing a grasping assembly, the grasping assembly having a carrier with a first food engaging fork and a second food engaging fork, each having a plurality of fork prongs extending therefrom; directing the fork prongs of the first and second food engaging forks into the bread, wherein the fork prongs of the first food engaging fork and the fork prongs of the second food engaging fork are spaced apart from each other; cutting the bread between the first and second food engaging forks into a first bread portion and a second bread portion, each having a cut inner surface, defining a second closed configuration; pivoting at least one of the first food engaging fork and the second food engaging fork relative to the other of the first and second food engaging forks so as to separate the inner surface of the first bread portion from the inner surface of the second bread portion; applying a foodstuff onto one of the first inner surface and the second inner surface; and pivoting at least one of the first food engaging fork and the second food engaging fork toward the second closed configuration, to, in turn, sandwich the foodstuff therebetween.

BRIEF DESCRIPTION OF THE DRAWINGS

The disclosure will now be described with reference to the drawings wherein:

FIG. 15 of the drawings is a sequential partial perspective view of the cutting station assembly as it interfaces with the carrier and the food engaging forks, cutting a bagel.

DETAILED DESCRIPTION OF THE DISCLOSURE

Figure 1:
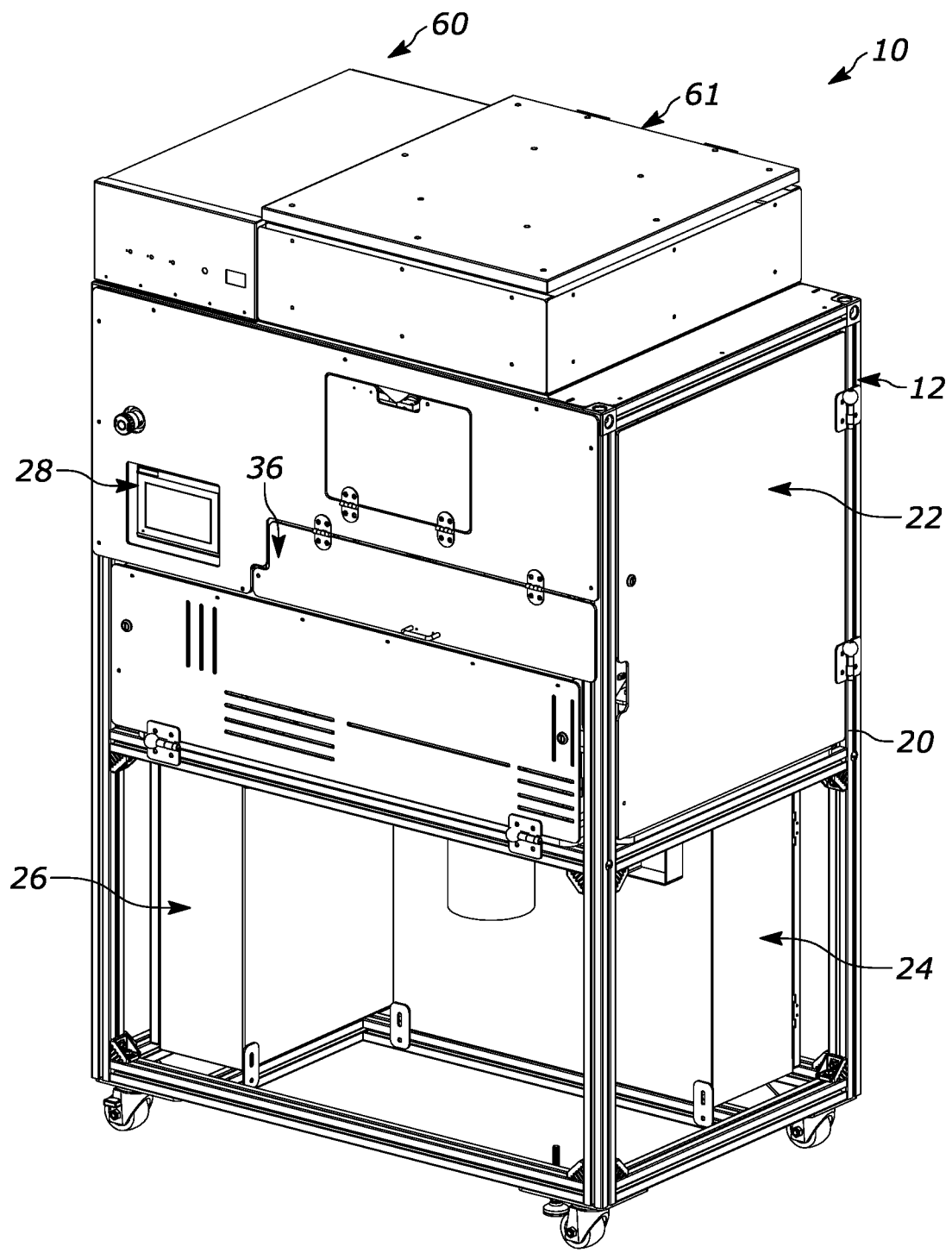
FIG. 1 of the drawings is a perspective view of the automated food preparation apparatus of the present disclosure.
Figure 2:
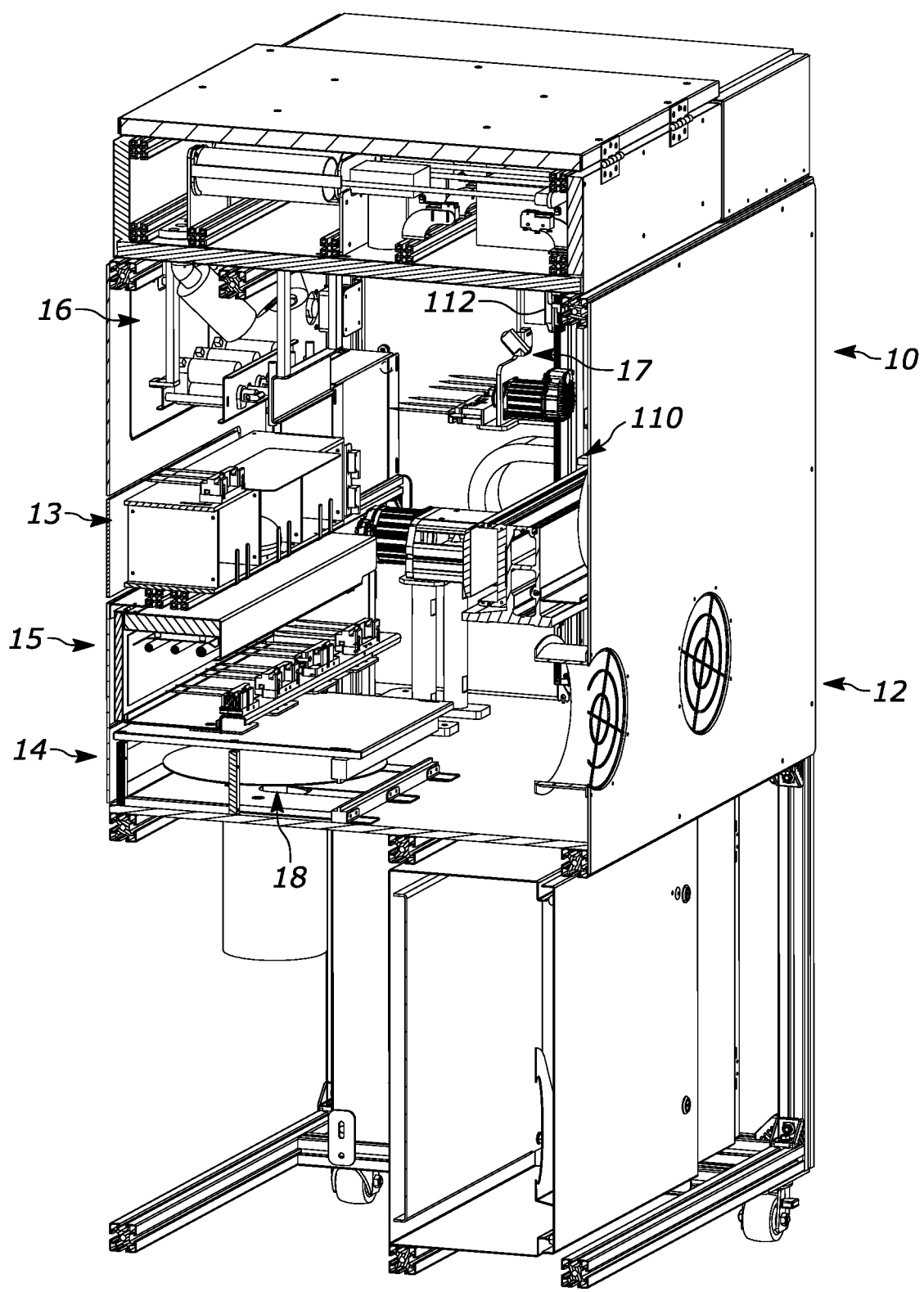
FIG. 2 of the drawings is a cross-sectional perspective view of the automated preparation apparatus of the present disclosure, showing, in particular, many of the station assemblies.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIGS. 1 through 4, an automated food preparation apparatus is shown generally at 10. The automated food preparation apparatus is configured to prepare sandwich type provisions. It will be understood that sandwich type provisions include a number of different configurations, such as submarine sandwiches, bagels, croissants, burgers, among others. And, it will further be understood that the particular disclosure is not limited to any particular one of these provisions or to the manipulation of bread or grain based provisions, and the disclosure has applicability in a number of different types of provisions. In the present configuration, the disclosure will be described in the configuration of handling bagels, but it is not so limited, as set forth above.

In the configuration shown, the automated food preparation apparatus includes housing 12, food placement and pickup station 13, cutting station assembly 14, toasting station assembly 15 and spread applying station assembly 16. It will be understood that a number of other stations may be further supplied or utilized, including but not limited to a customer ordering station, produce applying station, a deli meat applying station, a dairy applying station, a food packaging system and the like. Of course, these are merely exemplary, and other stations are likewise contemplated. Additionally, it will be understood that some of these stations can be eliminated or not utilized, but present, depending on the particular desired provisions, installations, and/or configurations.

In this configuration, the bagels are directed about the apparatus through the grasping, locating and moving (the "glm") system 17 which cooperates with the dimension determining system 18. In the configuration shown, the grasping, locating and moving system is positioned, as will be described below, behind the other systems so as to shuttle the bagel between the different station assemblies. The dimension determining system 18 is positioned proximate the cutting station assembly 14. It will be understood that the dimension determining system can be associated with other station assemblies or separate and removed from the station assemblies in an area distally spaced from the station assemblies.

Referring again to the drawings, the housing 12 is shown as comprising frame 20, encasing walls 22, power supply 24, controller 26 and user interface 28. It will be understood that the configuration of the frame and walls may take a number of different configurations, however, in the present disclosure, the frame defines a generally rectangular cubic configuration that is separated into a plurality of regions, a lower region, a middle region and an upper region. Most of the station assemblies are positioned within the middle region which is generally encircled by a plurality of encasing walls. The power supply and controller are positioned in the lower region. It will be understood that the controller may comprise a general purpose computer or another programmable computing device. Portions of the spread applying station assembly 16 are positioned in the upper region of the housing so as to essentially extend over the remainder of the stations. The user interface 28 is generally disposed on the middle region and in a region wherein the interface can be easily accessed by a user (preferably, proximate and/or in view of the food placement and pickup station). It will be understood that the encasing walls may be opaque, translucent or transparent so as to selectively allow for viewing of the interior of the frame. In some configurations, it may be desirable to allow a user or a consumer to view the preparation in realtime. In other configurations, it may be desirable to have the station assemblies maintained behind opaque panels, and generally not viewable to a user or consumer.

It will be understood that the housing shown herein defines a generally portable unit that can be wheeled into a desired location for placement and use, while it is contemplated that other configurations may have permanently installed configurations. Additionally, the structures herein are scalable so as to be able to accommodate multiple or additional or larger station assemblies so as to be able to increase the rate of production of consumable food preparations. The disclosure is not limited as to size, configuration and position or placement of the housing.

Figure 4:
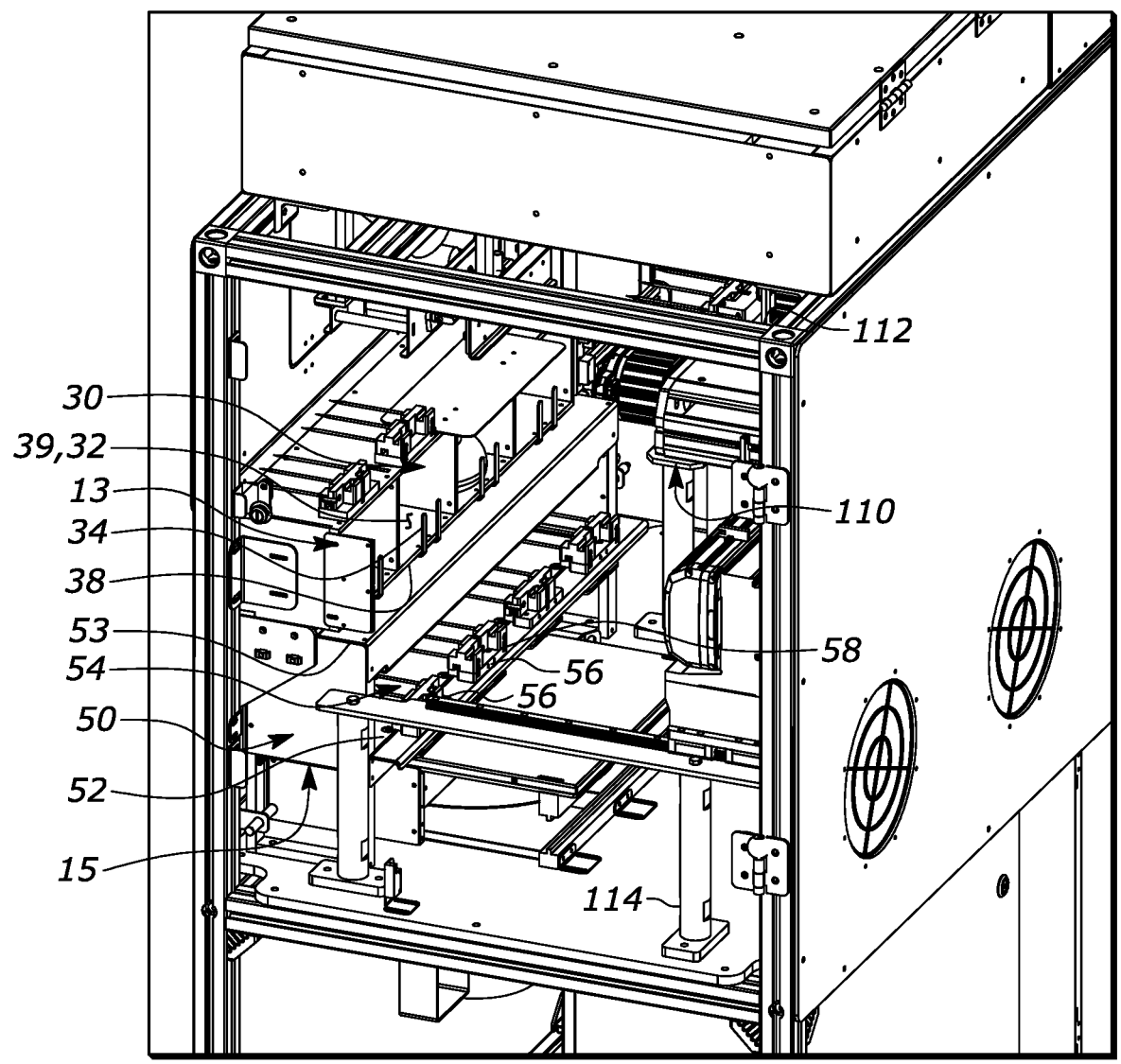
FIG. 4 of the drawings is a partial cross-sectional perspective view of the automated preparation apparatus of the present disclosure, showing, in particular, the food placement and pickup station and the toasting station assembly.

The food placement and pickup station 13 is shown in greater detail in FIG. 4 as comprising a plurality of cubbies, such as cubby 30. It will be understood that in the configuration shown, a total of four separate cubbies are presented in a side by side configuration. The cubbies each have a base 32, a backstop 34 wherein outside access is allowed through outside cover 36 (FIG. 1) which is hinged to the encasing walls 22.

The base 32 includes external side 37, internal side 38 and upper surface 39. In the configuration shown, the base defines a generally planar member and a wall separates the individual cubbies from each other. It will be understood that the bagels are placed from the external side 37 and that they are handled by the grasping, locating and moving system from the internal side 38.

The backstop 34 is shown as comprising two spaced apart, substantially vertical members that extend upwardly from the base 32 at the internal side. The backstop extends only partially from the upper surface of the base, such that the provision can be removed and replaced without being obstructed by the backstop. Additionally, the backstop components allow the fork prongs of the food engaging forks 70 to extend therebeyond and into the respective one of the cubbies 30.

Figure 3:
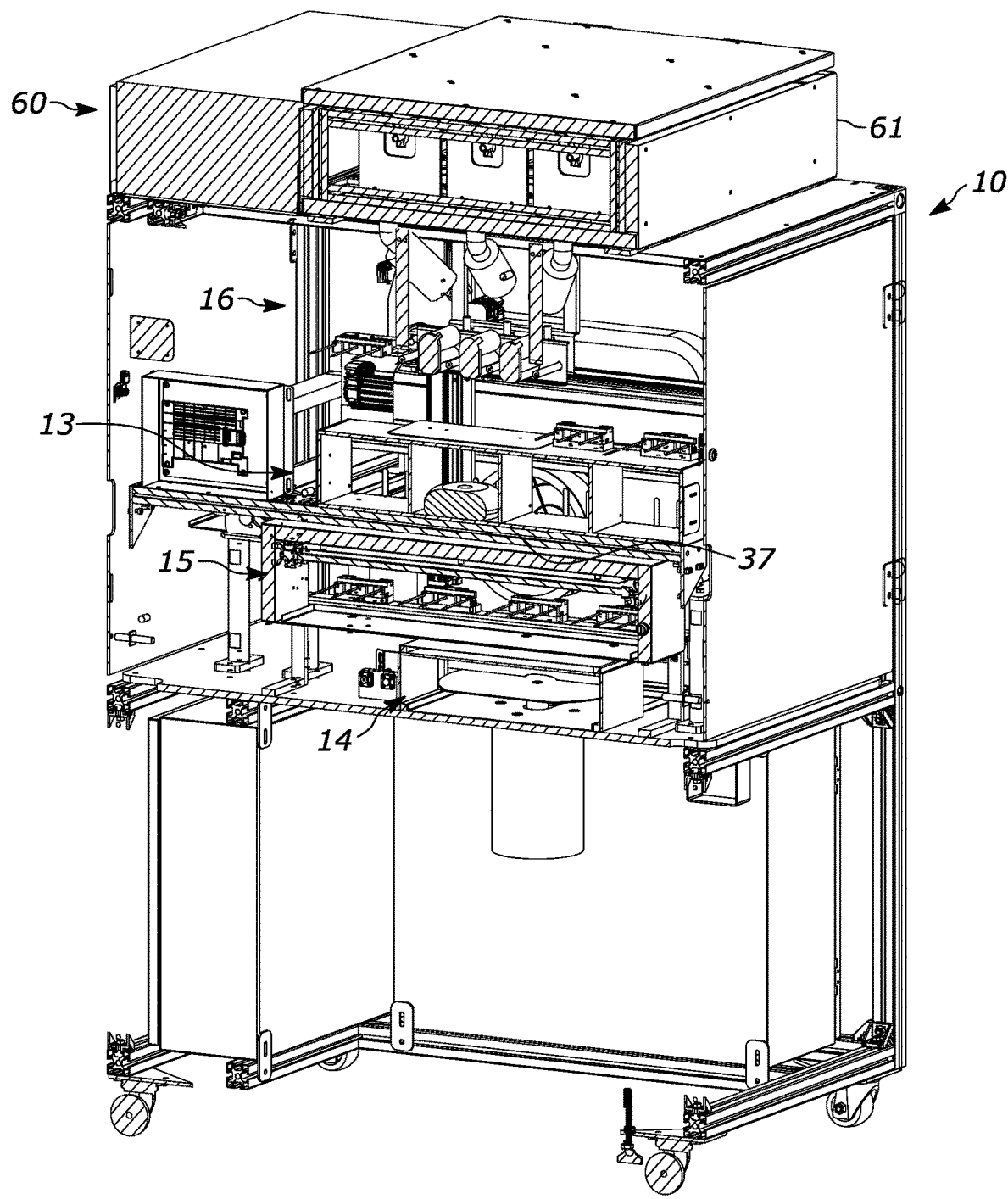
FIG. 3 of the drawings is a cross-sectional perspective view of the automated preparation apparatus of the present disclosure, showing, in particular, many of the station assemblies that lie behind the encasing wall at the front of the housing.
Figure 5:
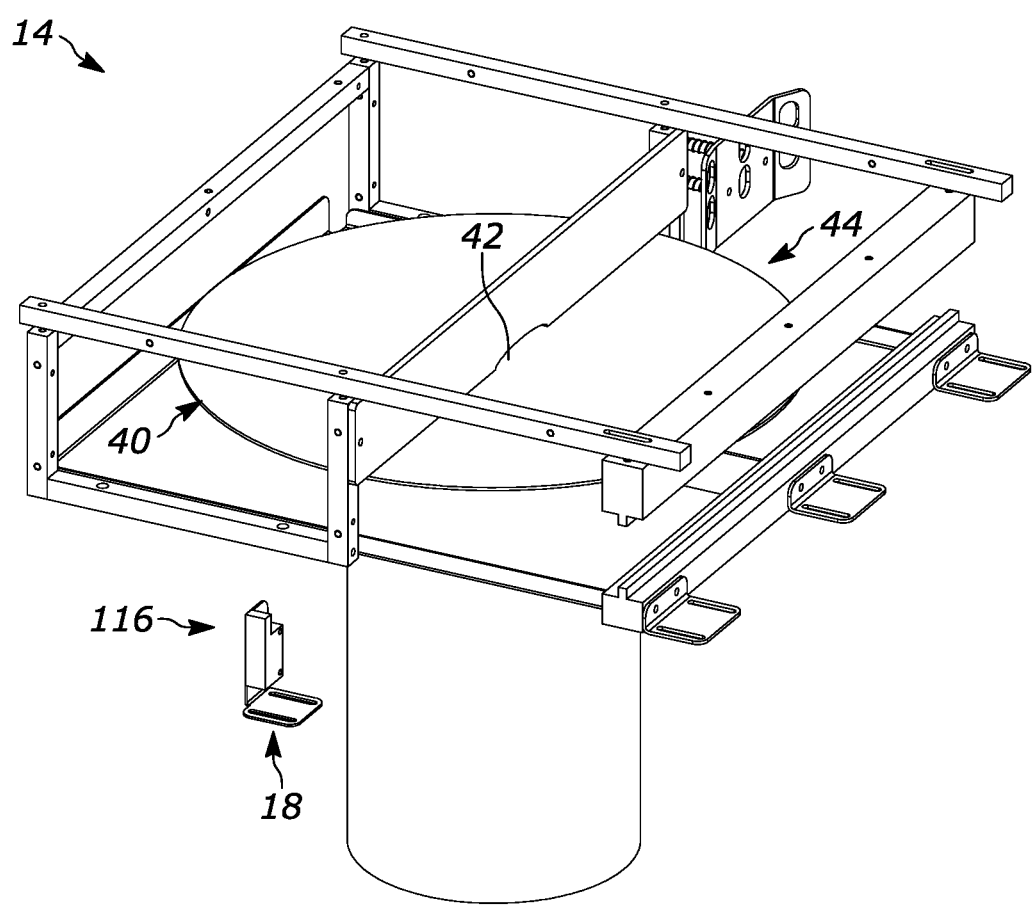
FIG. 5 of the drawings is a perspective view of the cutting station assembly.

The cutting station assembly 14, in the configuration shown in FIGS. 3, 5 and 15, is positioned below the food placement and pickup station and the toasting station assembly 15 (which will be described below). With further reference to FIG. 5, the cutting station 14 includes cutting blade 40 which rotates about axis of rotation 42, and food presentation region 44. In the configuration shown, the cutting blade 40 comprises a cutting wheel having cutting teeth about the outer perimeter thereof. In other configurations, a slicer of a different type may be utilized, including but not limited to a knife edge, a movable cutting blade or wheel, among others. The cutting blade generally rotates about the axis of rotation which is generally perpendicular to the system, so that the cutting blade is generally parallel to the base 32 of the cubby. Of course, in other configurations, other blade angles are contemplated including vertically positioned blades, and blades that are obliquely positioned.

The dimension determining system 18 can be cooperatively positioned proximate the cutting station assembly. In the configuration shown, the dimension determining system includes dimension sensor 116. The dimension sensor is positioned so that, before, after or during cutting, the diameter of the bagel can be determined. Additionally, the thickness of the bagel can be measured by the dimension determining system through the dimension sensor, or plurality of sensors. Such a determination assists with, for example, the proper placement of the bagel during the application of a spread, in, for example, the spread applying station assembly, as well as the proper cutting for the bagel.

It will be understood that in configurations wherein provisions are supplied that are other than circular, a number of different sensors can be employed to determine the dimensions of the provision (including but not limited to length, width and height). In still other configurations, it may be necessary or desirable to create a three-dimensional outer surface contour of the provision. In the configuration shown, as the bagel is circular, a single sensor can provide sufficient details as to the length and width (which is sufficient information for the spread applying station assembly in the present disclosure).

Figure 12A:
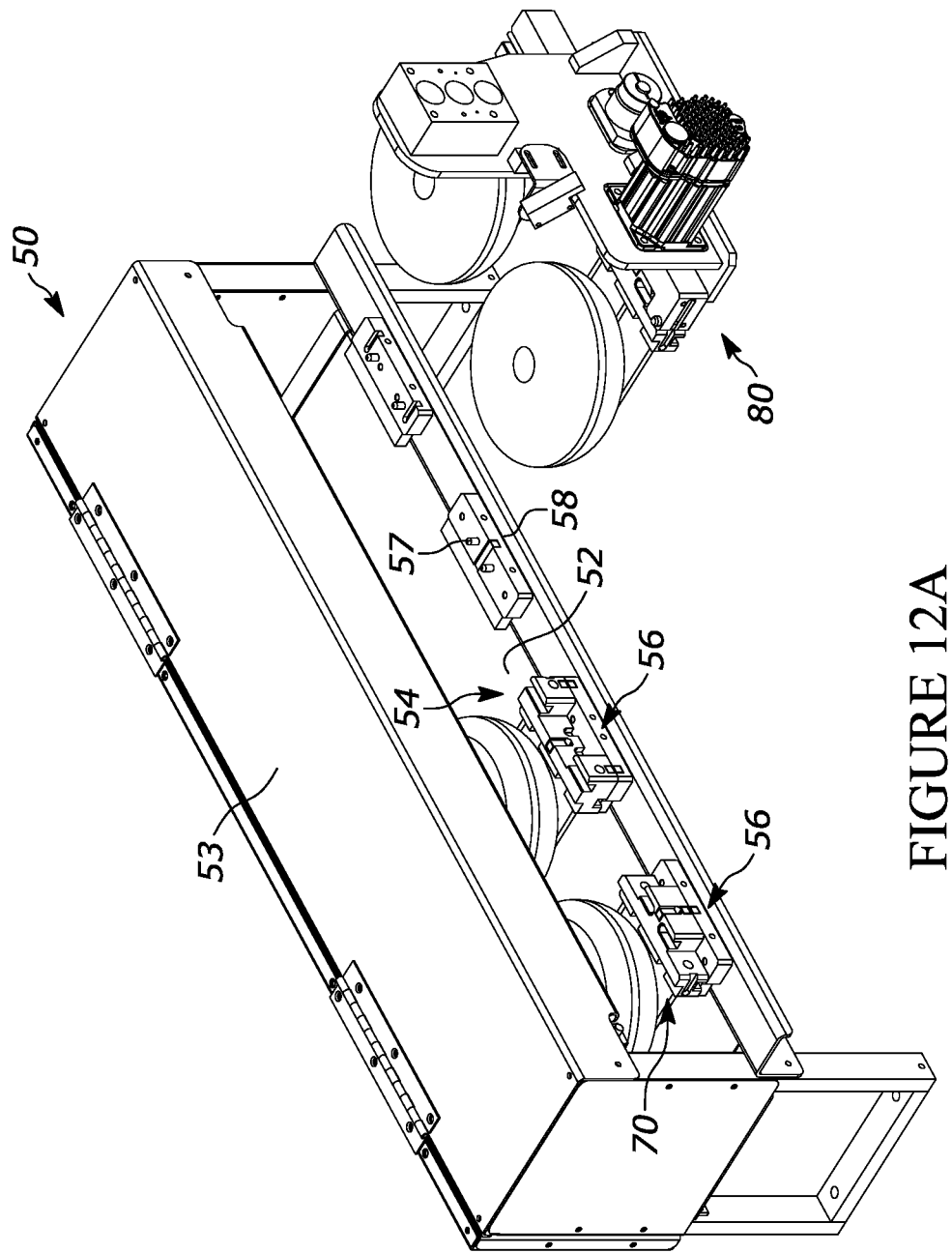
FIGS. 12a and 12b of the drawings are perspective views of the toasting station assembly, showing, the interaction of the carrier and the food engaging forks therewith.
Figure 12B:
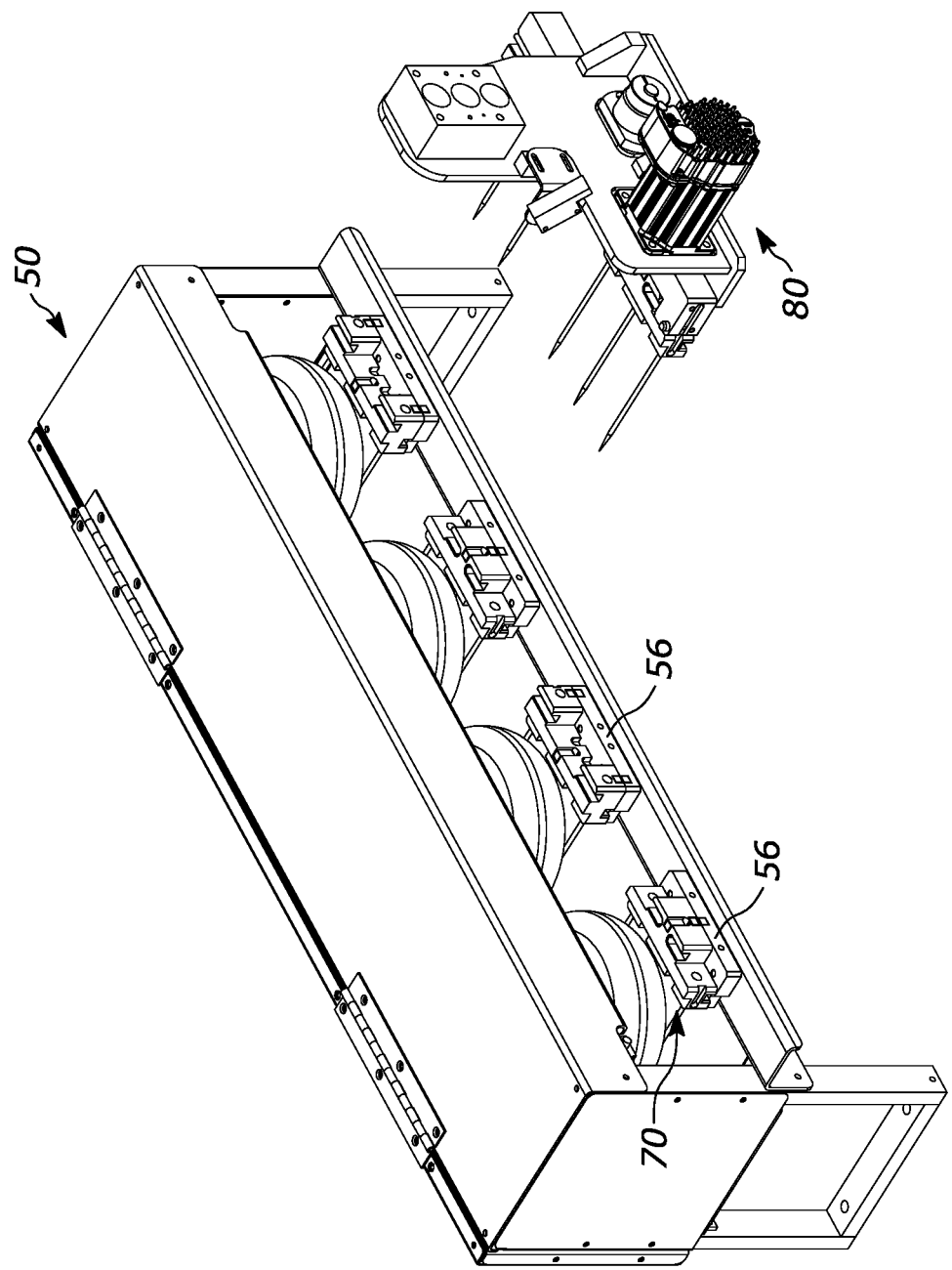
Figure 13A:
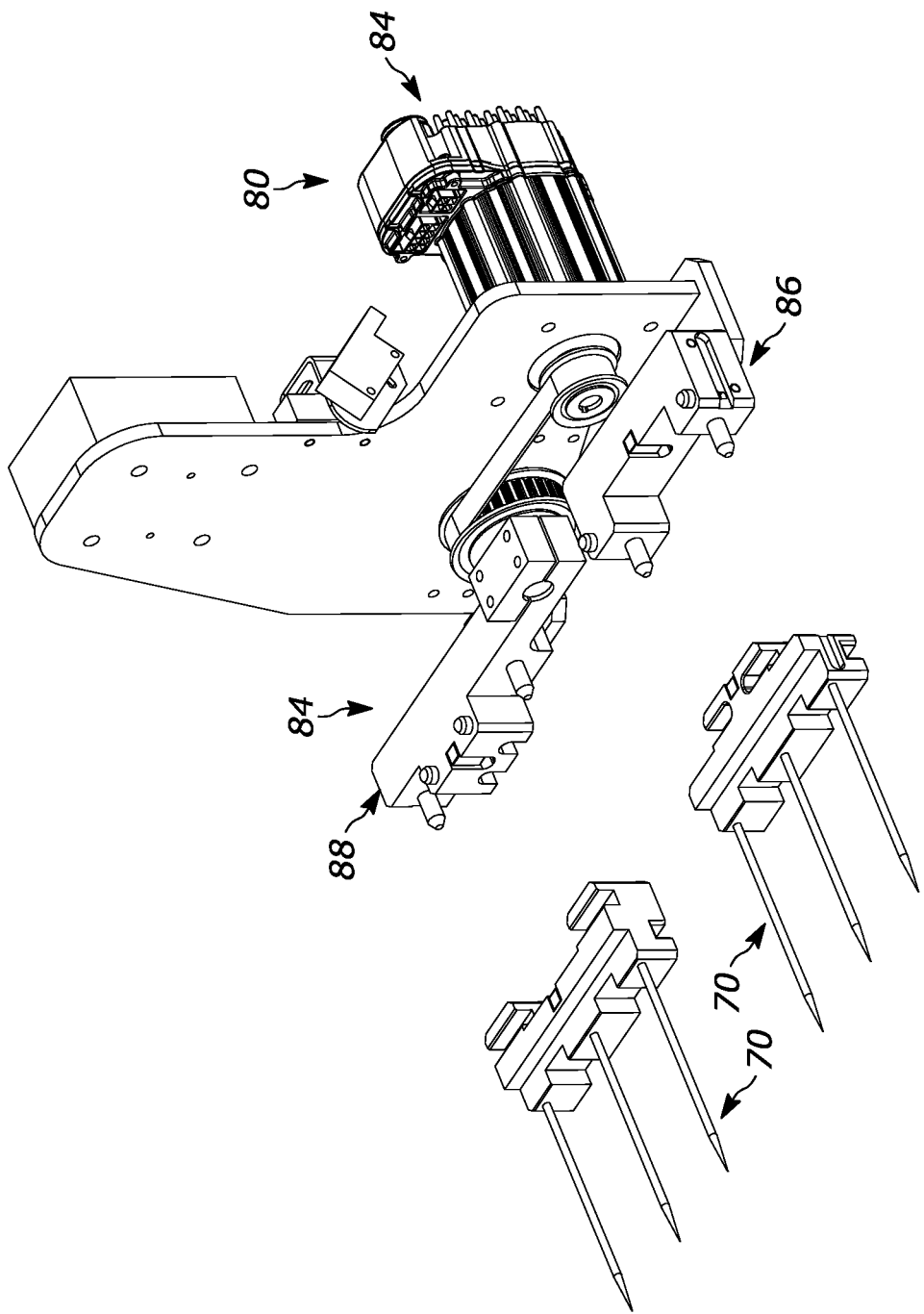
FIGS. 13a through 13f of the drawings are perspective views of the carrier and the food engaging forks, with the carrier manipulating the food engaging forks so as to move the bagel halves relative to each other.
Figure 13B:
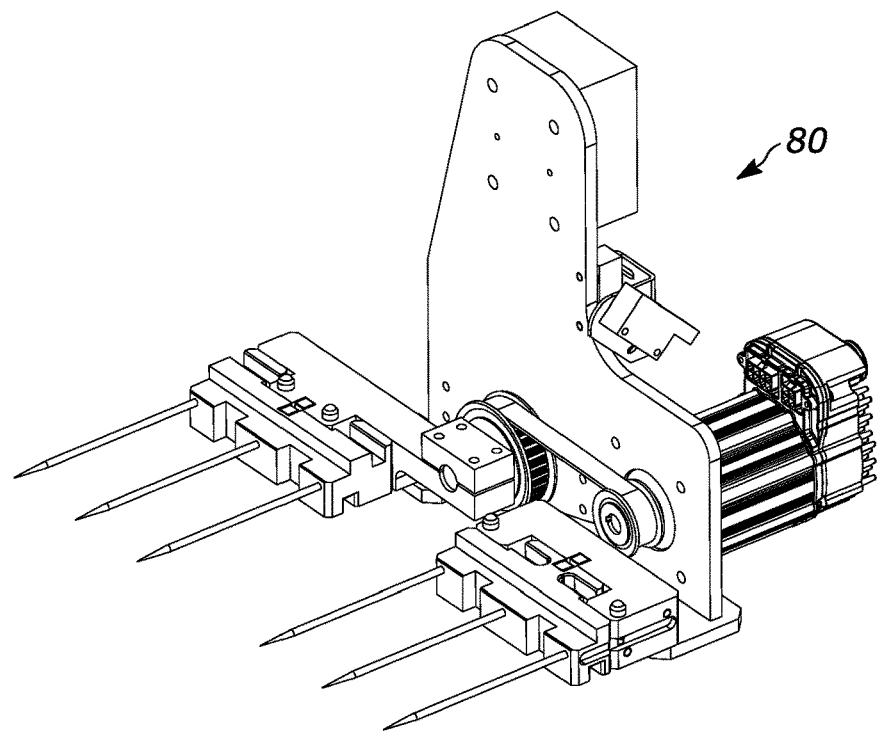
Figure 13C:
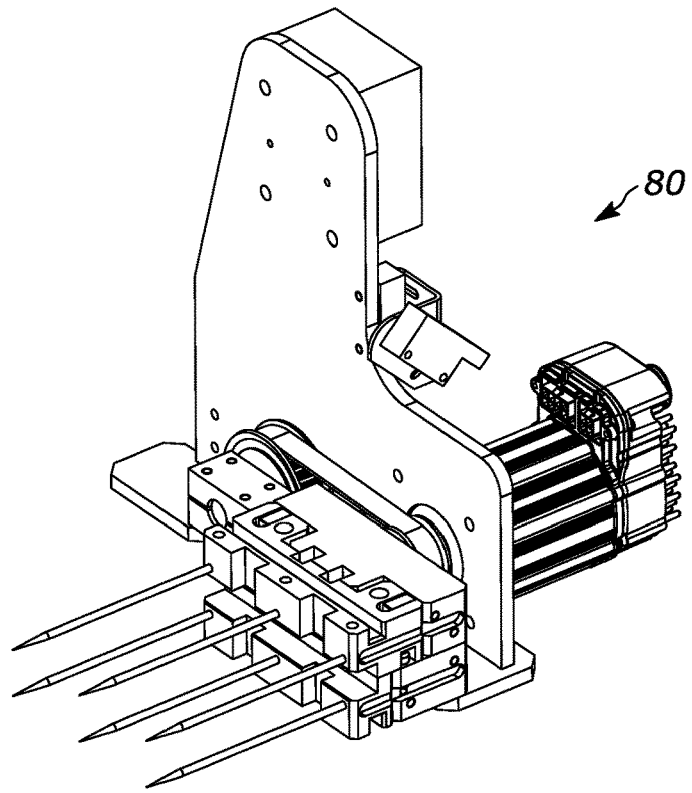
Figure 13D:
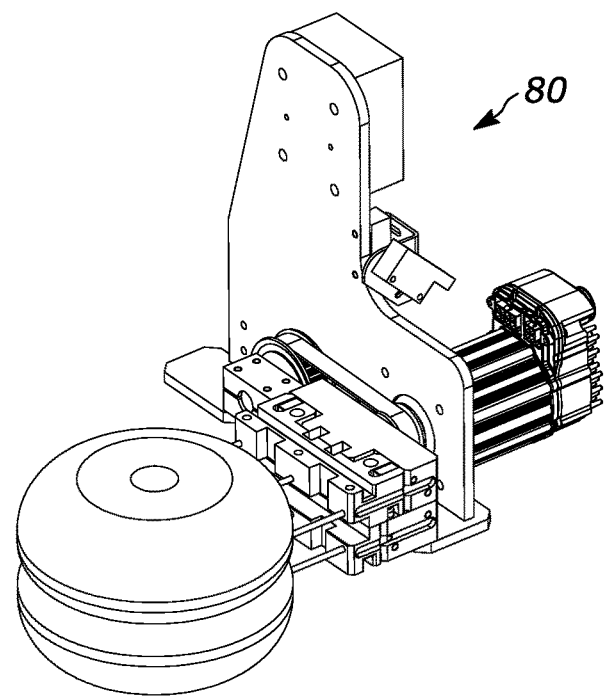
Figure 13E:
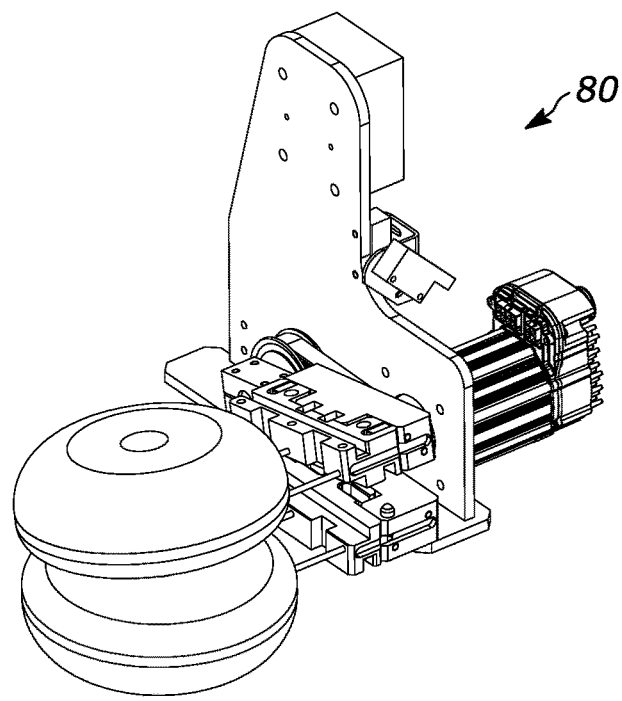
Figure 13F:
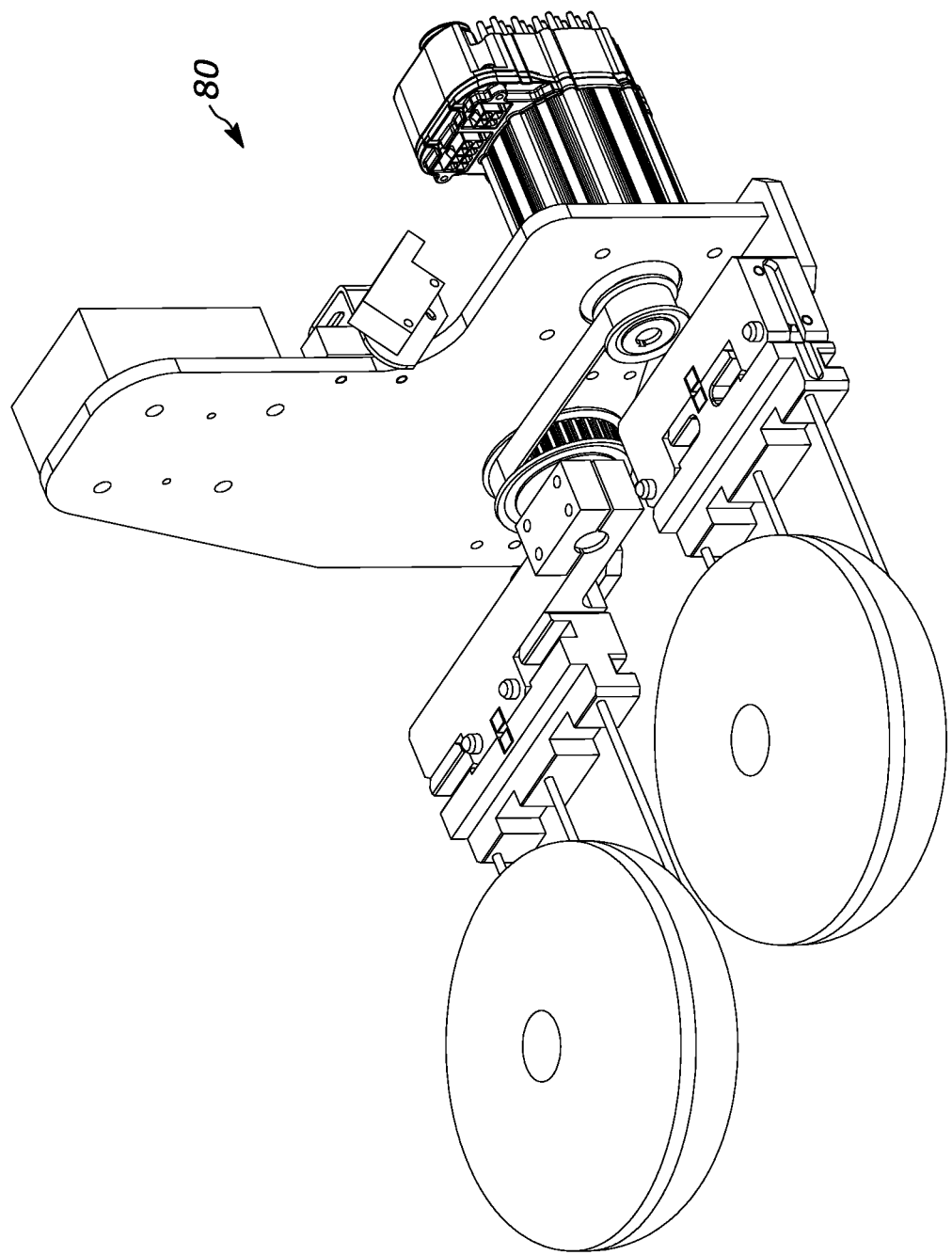

The toasting station assembly 15 is positioned between the food placement and pickup station 13 which is above the toasting station, and the cutting station assembly 14, which is positioned below the toasting station. With additional reference to FIGS. 12*a* and 12*b*, the toasting station assembly 15 includes toasting oven body 50 (which includes a heating element or multiple heating elements, not shown) and fork engaging coupling pairs 56. The toasting oven body includes base 52, ceiling 53 and internal opening 54. In the configuration shown, the toasting oven is configured with four stations in a side by side orientation, with a single continuous internal opening 54. A total of two fork engaging coupling pairs 56 are disposed in a side by side orientation at the single continuous internal opening 54. The fork engaging coupling pairs include mating prongs 57 and magnets, such as magnet 58 (it will be understood that in other configurations, this may comprise hooks or other physical couplings, solenoid pins, and/or vacuum pins, among others). In the configuration shown, the position of the forks generally is generally directly below the cubbies of the food placement and pickup station. It will be understood that the food engaging forks are preferably maintained with the bagel or other food stuff when the same is in the toasting assembly station (while being disconnected from the carrier). This insures that the bagels remain indexed to the food engaging forks, and they can be reassembled into substantially perfect alignment after being toasted.

Figure 6:
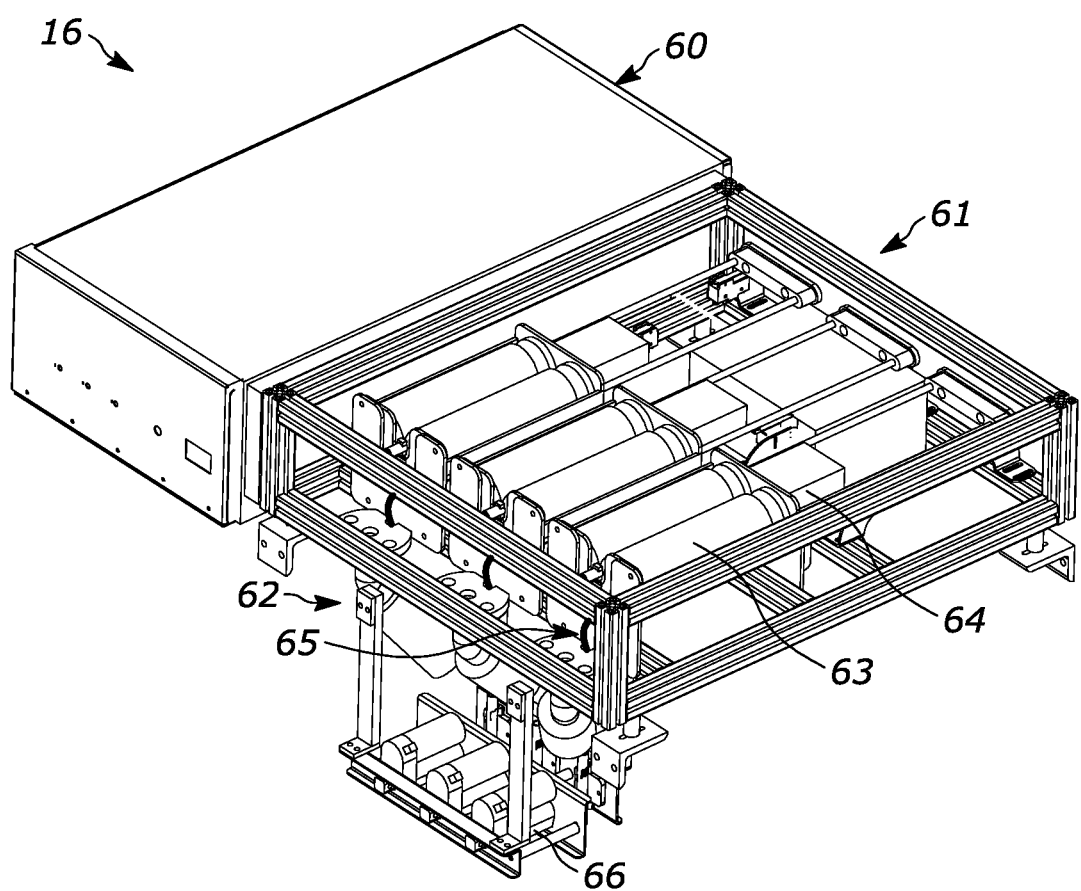
FIG. 6 of the drawings is a partial perspective view of the spread applying station assembly, with some of the insulation removed from around the cooling volume.
Figure 7:
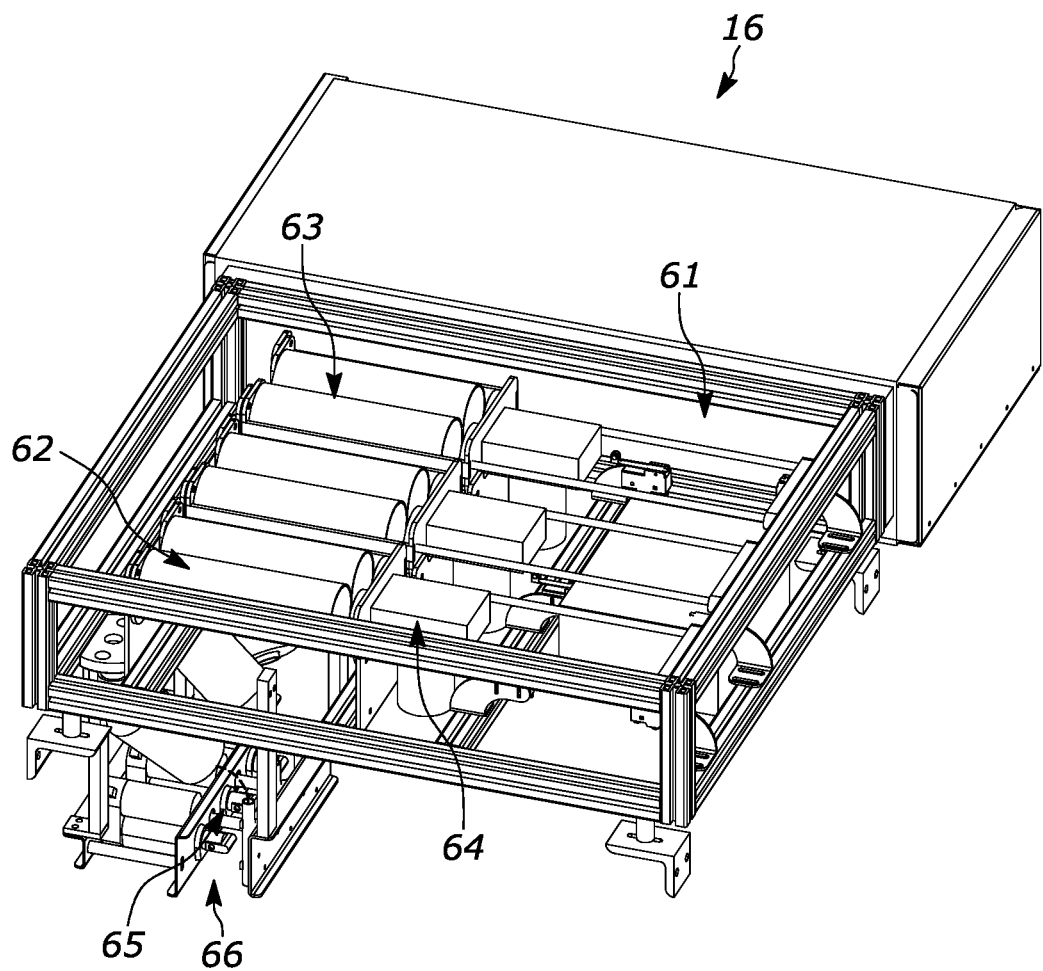
FIG. 7 of the drawings is a partial perspective view of the spread applying station assembly, with some of the insulation removed from around the cooling volume.

The spread applying station 16 is shown in FIGS. 6 and 7 as comprising refrigeration unit 60 and spread dispensing system 62. The refrigeration unit 60 includes cooling volume 61, wherein the spread cylinders containing spread are positioned and retained. The refrigeration unit 60 includes, most commonly, a compressor style refrigeration unit, that can cool a volume, such as cooling volume 61. In the configuration shown, the spread applying station assembly is positioned over the food placement and pickup station, and generally extends over substantially the entirety of the frame.

The spread dispensing system 62 includes spread cylinders 63, spread pistons 64, dispensing tube 65 and shutoff actuators 66. The spread cylinders each are filled with a desired spread (i.e., condiments, or, for example, different flavors of cream cheese or the like). The spread pistons 64 are slidably movable within the dispensing tube to selectively alter the volume of the spread cylinders. The spread pistons 64 may include motors or actuators that provide the necessary movement to the pistons relative to the spread cylinders.

The dispensing tube 65 is in fluid communication with the spread cylinder opposite the spread pistons at one end and extends to a dispensing outlet. It will be understood that as the piston is forced or directed toward the dispensing tube, the contents of the spread cylinder are directed through the dispensing tube. The shutoff actuator 66 selectively engages and pinches the dispensing tube to selectively allow and preclude the passage of material through the outlet of the dispensing tube. In the configuration shown, the shutoff actuator comprises an electric cylinder that directs an accompanying piston into contact with the dispensing tube proximate the dispensing outlet.

In the configuration shown, there are a total of three different spreads that can be delivered. Each spread includes a double barrel spread cylinder having a double barrel spread piston. In some configurations, the double barrel spread cylinders can have the same or a different spread positioned therein, wherein the system automatically combines the two different spreads through the dispenser. It is further contemplated that a single spread cylinder is provided with a single spread, or that a plurality of spreads is provided. It is further contemplated that other dispensing systems, such as those utilizing pouches or flexible bags may be employed instead of the piston and cylinder configuration. It is further contemplated that the pistons and cylinders may be configured to accept single use flexible bags or pouches having a spread. It is further contemplated that, in some configurations, a spread or spreads can be utilized which do not require refrigeration or the like.

As set forth above, the provisions, in the configuration shown, the bagels are directed between the various station assemblies by the grasping, locating and moving system 17. In particular, and with reference to FIGS. 8 through 11 and 13*a* through 13*f*, the grasping, locating and moving system includes food engaging forks, such as food engaging fork 70, carrier 80 and moving arm assembly 110. The food engaging forks comprise, in the configuration shown, a pair of forks, each of which has a central body 72 and a plurality of fork prongs, such as fork prong 74. In the configurations shown, the central body of each of the forks is slightly different, and, it will be understood that variations are contemplated wherein the forks have the same configuration, and/or where the forks have a different configuration. In still other configurations, each of the forks within the grasping, locating and moving system has a unique configuration for the central body.

The central body includes a coupling structure 73. In the configuration shown, the coupling structure allows for coupling to the carrier 80, as well as to station assemblies, such as the fork engaging coupling pairs 56 of the toasting station assembly 15 (FIG. 4). In the configuration shown, the coupling structure 73 includes axial grasping openings 77 which cooperate with magnet 78, and transverse grasping openings 79 which cooperate with magnet 71. It will be understood that depending on the configuration, a number of different constructions of the central body 72 are contemplated.

The fork prongs 74 comprise, in the configuration shown, three substantially parallel fork prongs that extend outwardly from the central body. Each fork prong defines a proximal end 75 and a distal end 76. In the configuration shown, the fork prongs each have a generally circular cross-sectional configuration and the distal end 76 terminates at a point. Such a configuration allows for the penetration into the provision, in the configuration shown, a bagel, while minimizing marring and/or damage to the bagel.

Figure 8:
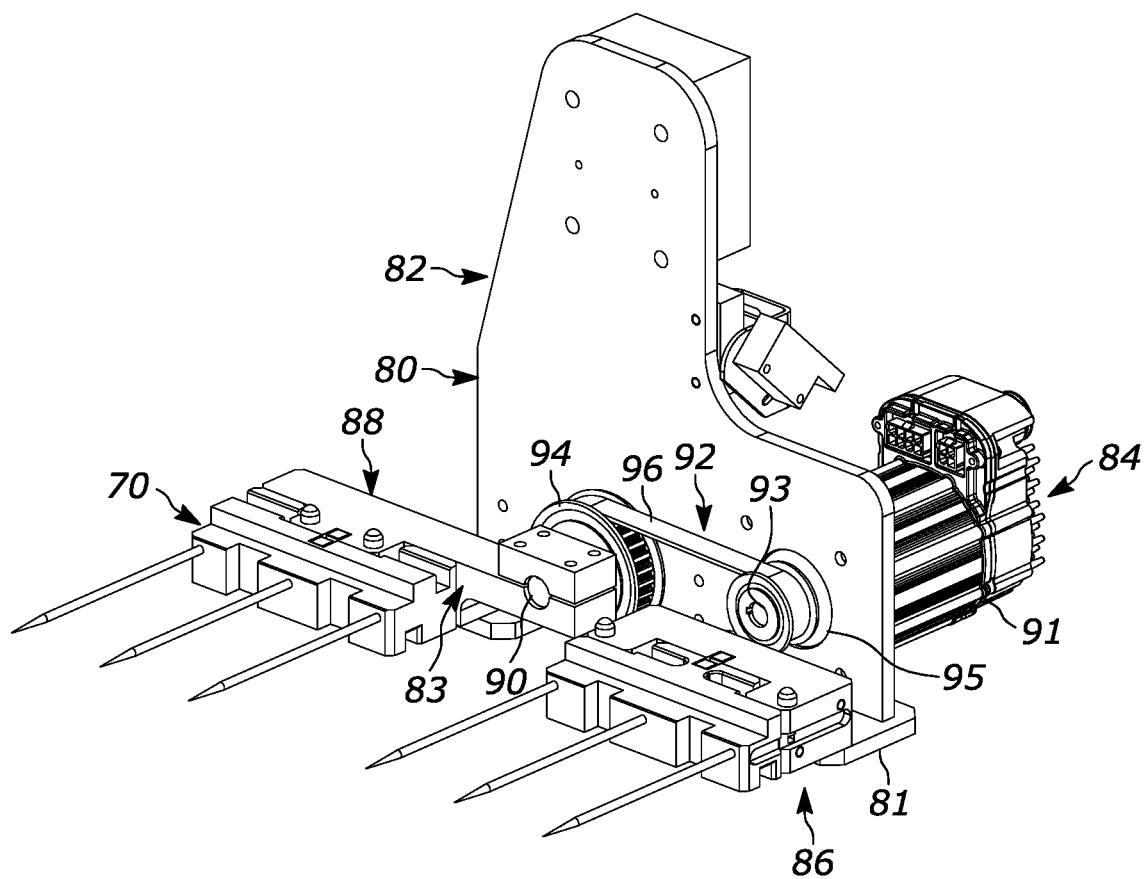
FIG. 8 of the drawings is a perspective view of the carrier and the food engaging forks of the grasping, locating and moving system.
Figure 9:
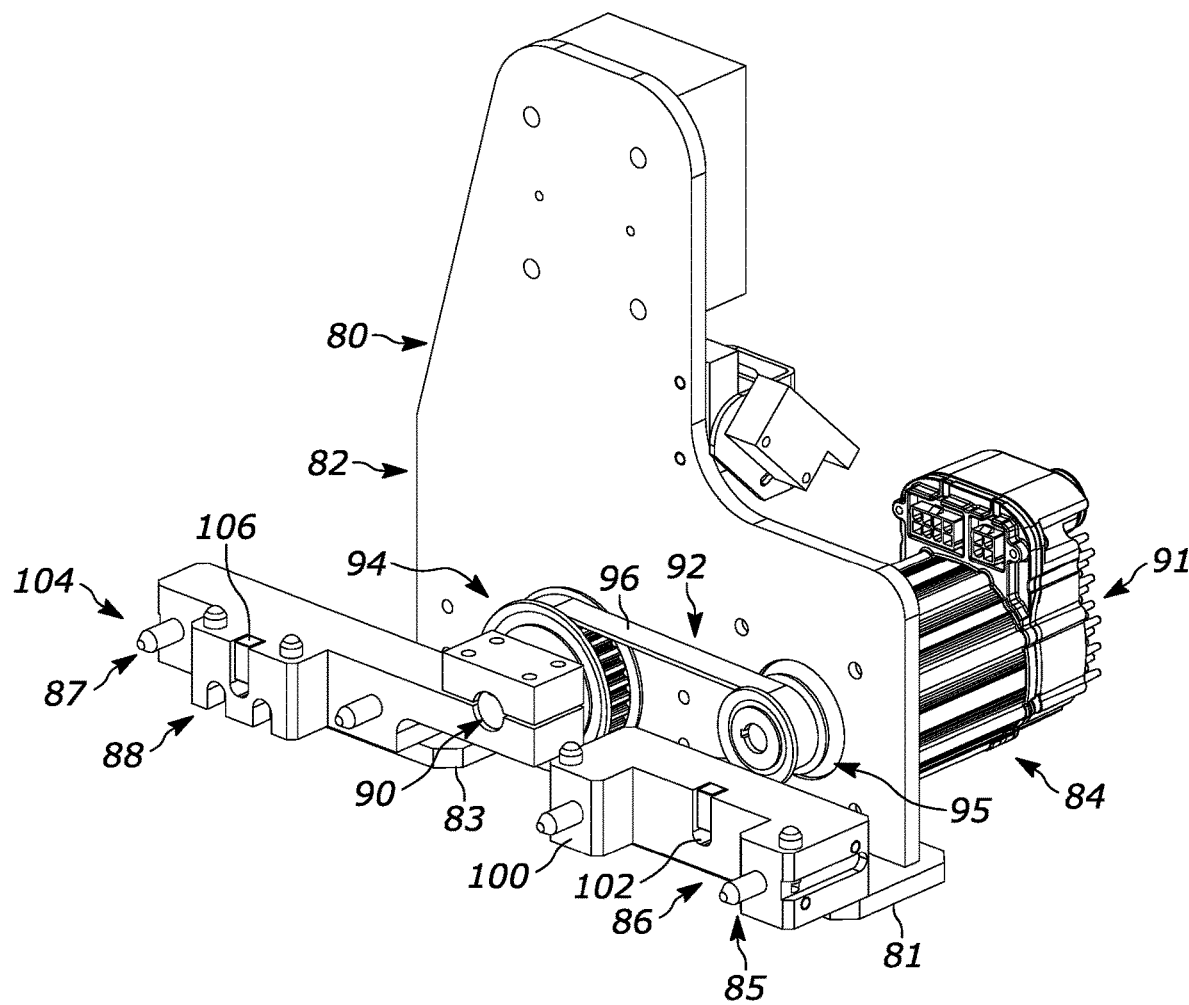
FIG. 9 of the drawings is a perspective view of the carrier of the grasping, locating and moving system.
Figure 10:
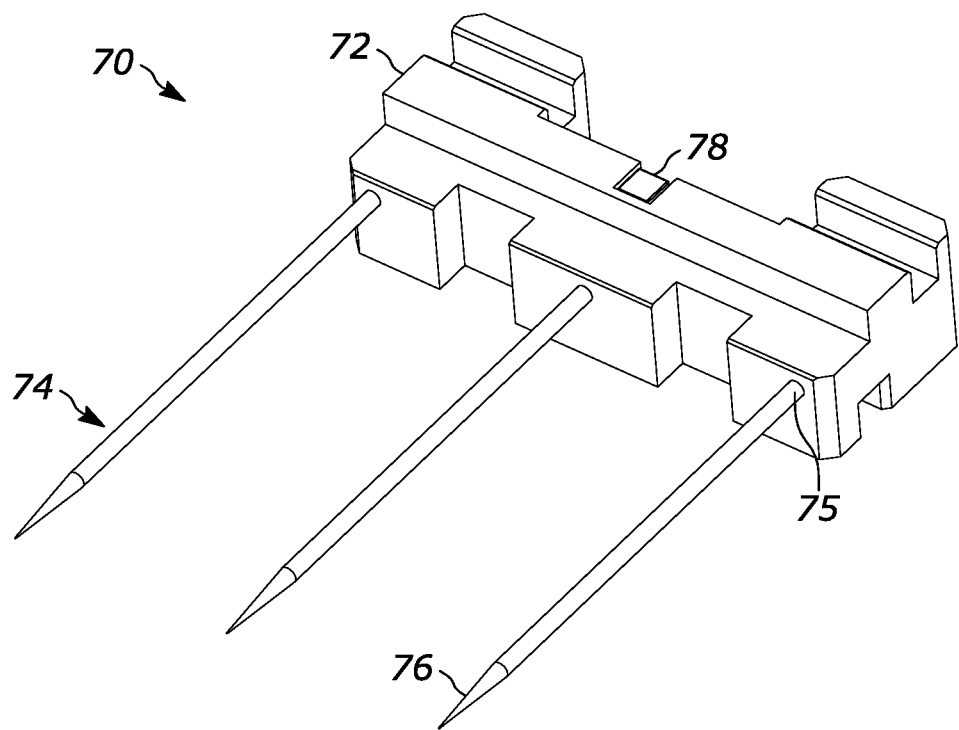
FIG. 10 of the drawings is a front, top perspective view of a pair of food engaging forks.
Figure 10:
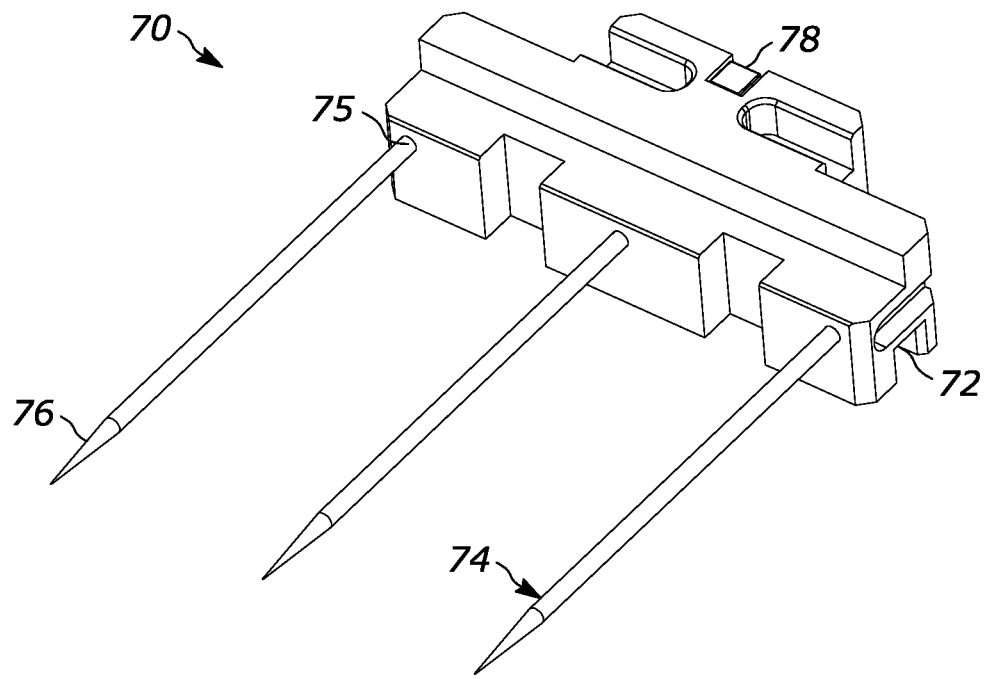
Figure 11:
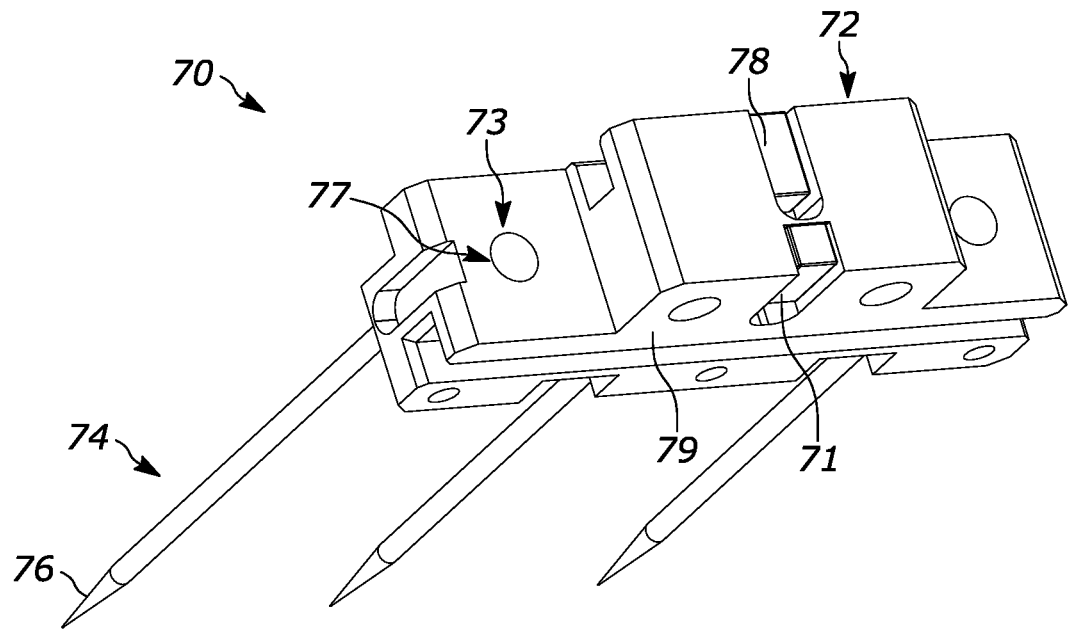
FIG. 11 of the drawings is a back, bottom perspective view of a pair of food engaging forks.
Figure 11:
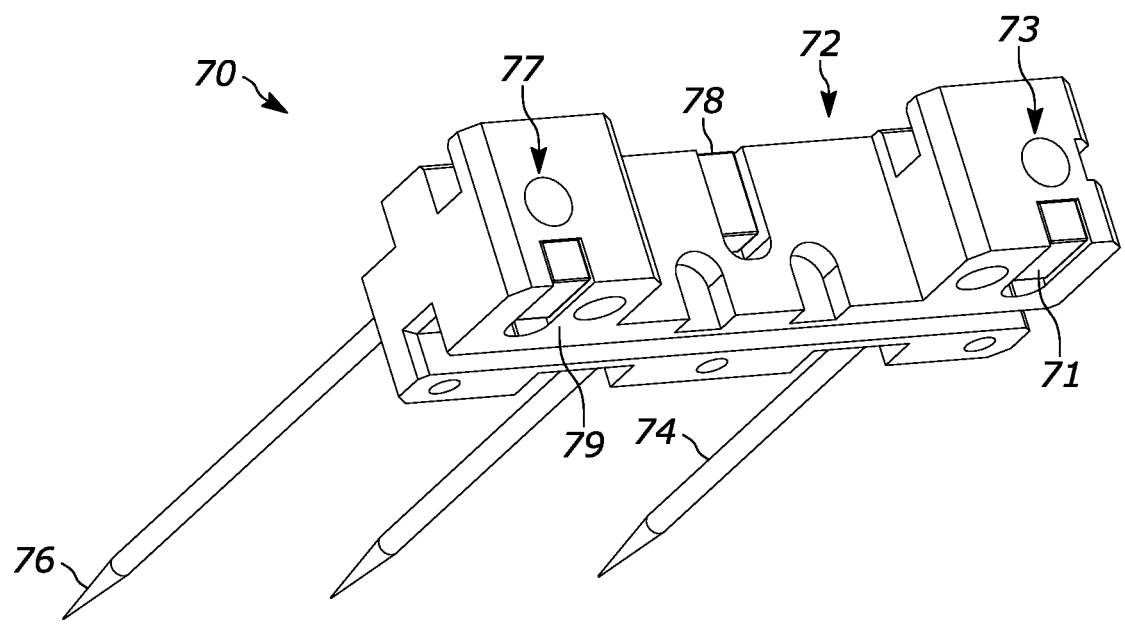

Carrier 80 is shown in FIGS. 8 and 9 as comprising base 82, fork pivoting assembly 84, first fork coupling 86 and second fork coupling 88. The carrier 80 is coupled to the moving arm assembly which facilitates the movement of the bagel (or other provision) about the various station assemblies. The base 80 includes first fork mount 81 and second fork mount 83. The fork pivoting assembly 84 includes fork pivot axis 90, motor 91 and transmission 92. The second fork mount 83 is mounted to the fork pivot axis 90 about an end thereof. It will be understood that the fork pivot axis is spaced apart from the first fork mount 81.

The motor 90 is spaced apart therefrom and includes output axis 93. The transmission includes fork cogged pulley 94, motor cogged pulley 95 and cogged belt 96. The fork cogged pulley 94 is mounted to the fork pivot axis 90. The motor cogged pulley 95 is mounted to the output axis 93 of the motor 91. The cogged belt 96 extends between the fork cogged pulley and the motor cogged pulley. It will be understood that the motor can be rotated, which, in turn, rotates the fork pivot axis 90, and in turn the second fork mount 83 relative to the first fork mount 81.

The first fork coupling 86 comprises engagement structure 85. The engagement structure, shown in FIG. 9, comprises axial prongs 100 and mating magnet 102. The first fork coupling is attached to the first fork mount 81. The second fork coupling 88 comprises engagement structure 87. The engagement structure includes axial prongs 104 and mating magnet 106.

With reference to FIG. 8, the carrier can be directed between at least two positions. In a first open position, the first and second fork couplings 86, 88 are positioned in a side by side orientation, with the fork prongs being in a side by side configuration. With additional reference to FIGS. 13a through 13f, and in particular, FIGS. 13c and 13d, in a second closed position, the second fork mount 83 is rotated by the fork pivoting assembly so that the first and second fork couplings overlie each other. In such a configuration, the fork prongs of the food engaging fork coupled to the second fork mount is directly above the fork prongs of the food engaging fork coupled to the first fork mount. It will be understood that the fork pivoting system can be actuated to direct the second fork coupling into either one of the first open position and the second closed position. Depending on the configuration, it is contemplated that additional relative positions are contemplated. For example, a third loaded position is contemplated wherein the first fork coupling and second coupling are close to the second closed configuration, but where the second fork coupling is slightly rotated by the fork pivoting assembly away from the second closed configuration. In such a configuration the bagel parts, as will be explained below, can be maintained slightly apart from each other so as to allow for the existence of spread therebetween without squeezing out the spread that is positioned therebetween.

It will also be understood that a manner of movement, other than a pivoting of one of the fork couplings relative to a second of the fork couplings is contemplated. For example, one or both of the forks may be rotated, pivoted and/or translated relative to the other forks.

Figure 14:
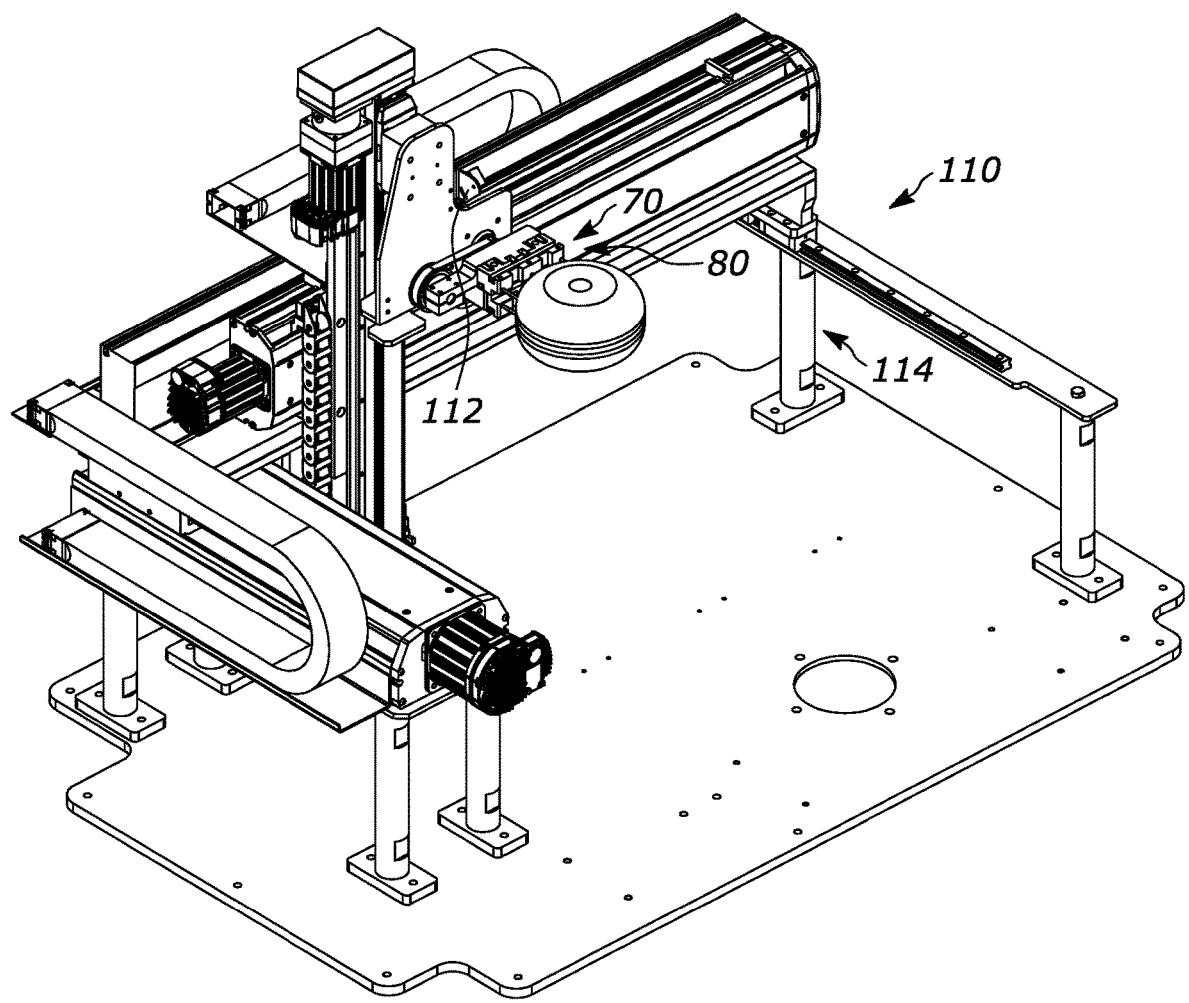
FIG. 14 of the drawings is a perspective view of the moving arm assembly, showing, in particular, the carrier and food engaging forks coupled thereto.

Referring now to FIG. 14, the moving arm assembly 110 includes a carrier attachment 112 and a base 114. The carrier attachment 112 couples the carrier 80 to the end of the moving arm assembly. The base 114 is coupled to the frame. In the configuration shown, the moving arm assembly comprises a three axis actuator. One such actuator is available from Toyo Automation Co. Ltd. Of Taiwan, under the model number EXYZ-G1-300-600-550-K-E842. Of course, this is exemplary only and other actuators are contemplated. In other configurations, a multi-axis robotic arm may be utilized. In still other configurations, multiple actuators may be utilized to effectuate the transport of the bagel, or other provision, between the different station assemblies.

The operation will be described by directing a bagel through the system from order to final delivery of the prepared food provision, in this case, the bagel. Reference is made to each of the drawings to follow the production of the food provision. Again, it will be understood that the preparation disclosed is merely exemplary and that a number of variations, additions, and deletions are contemplated.

In one configuration, the user obtains an order from the customer. In the contemplated configuration, the customer can choose at least the following: type of bagel, optional toasting (and degree of toasting, i.e., no toast, light, medium and dark toasting), optional spread, and a choice of spreads. As such, the customer has initially selected the bagel that is desired, and has provided the order to the user. The user first selects the proper bagel and places the bagel into an open cubby in the food placement and pickup station. It is also contemplated that a rack of various bagels could be part of the automated system. The customer could select their bagel type from the screen and the automated system would retrieve their selected bagel from the rack.

Once positioned, the user can, utilizing the user interface, enter the order of the customer, as to toasting and spread selections. To effectuate the same, the user identifies the desired configuration of the food preparation, and the starting location of the bagel within the food placement and pickup station. It will be understood that in some configurations, the user interface can be mated to a register or point of service terminal wherein the purchase and the providing of information to the automated food preparation apparatus can happen simultaneously with the same data entry. In still further configurations, the system may be a self service kiosk in which case the user and the consumer represent the same individual that undertakes both the tasks of selecting and the tasks of implementing the desired selection. It is further contemplated that in other configurations, customers order ahead of time (using a mobile device or web browser for example). The automated system would prepare the ordered bagel for the customer as the customer drives or otherwise travels to the store. The bagel would be ready upon arrival.

In still further configurations, it is contemplated that the selection of the bagel is automated, and the bagel selected is automatically transferred to the apparatus, or the bagel selection equipment is a portion of the apparatus itself.

For purposes of the example, the user has selected a bagel, selected toasting, and selected the application of one of the spreads thereonto. Once the proper bagel has been placed into the predetermined cubby of the food placement and pickup station, and the proper selections have been made on the user interface, the system is actuated. Upon actuation, the grasping, locating and moving system moves to pick up the bagel from the food placement and pickup station. The first and second food engaging forks, if they are not already fitted to the carrier, are obtained from a storage location (which, for example, may be on top of the food placement and pickup station, or elsewhere within the housing). In more detail, the axial prongs 100, 104 of the first and second fork couplings 86, 88 are directed into the respective ones of the axial grasping openings 77 of the coupling structure of the food engaging forks. As the structures are brought into alignment and engagement the magnet 78 interfaces with the mating magnets 102, 106 to bring the forks into full engagement and to retain the forks in such engagement.

The second fork mount is then rotated by the fork pivoting assembly so as to overlie the first fork mount, and to be in the second closed position. Once in such a configuration, the forks are directed by the moving arm assembly into position behind the cubby having the bagel. The food engaging forks are moved into the cubby so as to pierce the bagel sufficiently to retain the same. In the configuration shown, the three fork prongs of each of the forks engages the bagel in two rows of three, essentially on either side of the bagel (i.e., top and bottom), leaving the middle of the bagel substantially unobstructed.

Through the actuation of the moving arm assembly, the forks are moved upwardly, along with the bagel to clear the backstop of the cubby. Once cleared, the bagel can be moved into the housing over the backstop so as to exit the cubby. The bagel can then be directed to the cutting station assembly. At the cutting station assembly, the moving arm assembly 110 can first move back and forth proximate the dimension sensor 116 so as to determine the dimension of the bagel (i.e., the diameter of the bagel and the thickness, among other dimensions). Once that is determined, the system can save the data pertaining to the size of the bagel.

With additional reference to FIG. 15, the bagel can be directed across the cutting blade 40 by directing the first fork coupling above the cutting blade and the second fork coupling below the cutting blade. In this manner, the bagel is cut between the fork prongs of the upper food engaging forks and the lower food engaging forks. It will be understood that if it is desirous to cut a bagel in a configuration other than right through the middle, the moving arm assembly can effectuate different movements, resulting in different cuts. In addition, multiple cuts can be effectuated to create patterns or to remove a central portion of material from the bagel, for example. It is further contemplated that cuts to the bagel may be formed wherein the bagel is not fully separated into two or more components; rather, at least a portion of the bagel halves or parts remain partially connected.

Once the bagel has exited the cutting station assembly, the bagel can be moved to the toasting station assembly. In the configuration shown, the fork pivoting assembly is actuated to direct the food engaging forks into the first open configuration. Once in the first open configuration, the moving arm assembly directs the carrier and the pair of food engaging forks that are retaining the bagel into the toasting oven body. The forks are then positioned on the fork engaging coupling pairs, and directed into retained configurations through cooperating magnets. More specifically, prongs on the fork engaging coupling pairs are directed, respectively, into the transverse grasping openings of the food engaging forks.

It will be understood that the carrier can be decoupled from the food engaging forks at this time. For example, the carrier can be directed to a second or subsequent set of food engaging forks, and can begin to prepare a second bagel. In some configurations, a second bagel can be fully prepared before the first bagel is completed toasting. In other configurations, a second bagel can be directed into the toaster while the first bagel is in the toaster.

It will be understood that toasting is achieved by activating the heating element within or proximate the toasting oven body for a desired amount of time. In the configuration shown, the heating element is preferably directed over the bagel, so as to toast the inside surface. Of course, other surfaces may be toasted as desired. Once the bagel has been within the toaster for a sufficient or desired amount of time, the carrier can reengage the food engaging forks that are holding the first bagel. Once engaged, the carrier can be directed by the moving arm assembly in an upward direction to decouple the fork engaging coupling pairs from the transverse grasping openings of the food engaging forks. Once disengaged, the bagel can be moved out from within the toasting oven body.

The bagel is next directed to the spread applying station assembly. The spread dispensing system of the desired spread is activated, and the bagel is positioned below the dispensing end of the dispensing tube of the activated spread dispensing system. The bagel is then moved around while the spread is directed out of the dispensing tube and onto the surfaces of the bagel. It will be understood that, as the dimensions of the bagel were determined by the dimension sensor of the dimension determining system, as the bagel was at the cutting station assembly, the bagel is directed appropriately based on size so that the spread can be applied to the desired regions of the bagel. It will be understood that in some configurations, the spread applying station can apply spread to both bagel halves simultaneously. In other configurations, the spreads are applied sequentially to one half then the other. It will further be understood that in some configurations, multiple spreads may be applied to the bagel, simultaneously or sequentially.

Once the desired spread has been applied in a pattern determined by the motion of the bagel combined with the directing of the spread by the spread dispensing system, the bagel can be moved away from the spread applying station.

Once moved away, the fork pivoting assembly of the carrier can be activated, and the food engaging forks can be directed into the third loaded configuration, wherein the bagel halves are brought close together, but where the bagel halves remain partially separated to preclude the spread that has been applied from squeezing out between the bagel halves. In such a manner, the bagel has been reassembled, with care taken to ensure that the spread is not squeezed or negatively impacted by the reassembly of the bagel. Additionally, this manner also ensures that the bagel halves are aligned and re-assembled nearly perfectly in their pre-cut orientation.

Once placed into the third loaded configuration, the bagel is directed by the moving arm assembly back to the food placement and pickup station. In particular, the bagel is directed over and beyond the backstop of the desired cubby. Once fully into the cubby, the bagel can be lowered onto the upper surface of the base of the cubby. When on the base, or close to the base, the food engaging forks can be directed away from the cubby. Such movement directs the bagel into contact with the backstop. Further movement of the food engaging forks out of the cubby will result in the decoupling of the food engaging forks from the bagel, leaving the bagel in the cubby, while the forks can be utilized to grab a different bagel, and to begin the process all over again.

It will be understood that at any station where the bagel may be positioned for an extended period of time, such as with the toasting station assembly, the food engaging forks can be decoupled from the carrier and the moving arm assembly, at which time a subsequent set of forks can be coupled to the carrier and the processing of a subsequent bagel can be initiated. It will be understood that depending on the recipes of the bagels, it is possible to have four bagels at various stages of processing within the system. That is, one bagel can be in one of the four cubbies, a second bagel and a third bagel can each be toasting, while a forth bagel can be in the cutting station assembly or the spread applying station assembly. The particular number of bagels that can be handled at any one time is generally a limitation of the cubbies provided, as well as the particular recipes. It will be understood, for example, that coordination can be made and bagels can be made that do not require toasting, where multiple bagels are maintained within the toasting oven body. It will further be understood that with optimization techniques, or with data pertaining to the different recipes that are ordered most often, additions or reconfigurations of the system can be made. For example, the toasting oven body can be enlarged. In other configurations, it may be determined that it is desirable to decouple the food engaging forks at the spread applying station, and to have the dispensing tube move relative to a stationary bagel, or to have the bagel move through a means other than by the carrier and the moving arm assembly.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. An automated food preparation station comprising:
   one of a food placement and a food pickup station providing at least one of ingress into and egress from a housing;
   a cutting station assembly, having a cutting blade, the cutting station being positioned within the housing; and
   a grasping system within the housing, the grasping system further including,
   a first food engaging fork having a central body and a plurality of fork prongs extending from the central body;
   a second food engaging fork having a central body and a plurality of fork prongs extending from the central body; and
   a carrier, the carrier including a first fork coupling and a second fork coupling, the first fork coupling and the second fork coupling structurally configured to move together with the carrier, with at least one of the first fork coupling and the second fork coupling being able to pivot relative to the other of the first fork coupling and the second fork coupling;
   wherein the carrier further includes a fork pivoting assembly, defining a fork pivot axis, with the first fork coupling being fixedly coupled to the fork pivot axis, so that the first fork coupling can pivot about the fork pivot axis
   wherein the first fork coupling is structurally configured to pivot between a first orientation wherein the first food engaging fork and the second food engaging fork are positioned in a side by side configuration defining a first open configuration and a second orientation wherein the first food engaging fork and the second food engaging fork are positioned in a stacked orientation defining a second closed configuration.

2. The automated food preparation station of claim 1 wherein the plurality of fork prongs of the first food engaging fork and the plurality of prongs of the second food engaging fork are substantially parallel to each other in the second closed configuration.

3. The automated food preparation station of claim 2 wherein the plurality of fork prongs of the first food engaging fork and the plurality of prongs of the second food engaging fork are substantially coplanar with each other in the first open configuration.

4. The automated food preparation station of claim 1 wherein the first food engaging fork is configured to pivot through approximately 180° between the first open configuration and the second closed configuration.

5. The automated food preparation station of claim 1 wherein the first food engaging fork is configured to pivot relative to the second food engaging fork so as to remain spaced apart from each other in a stacked orientation that is different than when in the second closed configuration, to define a third loaded configuration.

6. The automated food preparation station of claim 3 wherein the carrier is configured to move within the housing between the at least one of a food placement and food pickup station and the cutting station assembly.

7. The automated food preparation station of claim 1 wherein the first food engaging fork and the second food engaging fork are releasably attachable to the carrier.

8. The automated food preparation station of claim 1 wherein the carrier includes a first fork coupling and a second fork coupling, each comprising a plurality of axial prongs with mating magnets.

9. The automated food preparation station of claim 1 wherein the central body of the first food engaging fork has a different configuration than the central body of the second food engaging fork.

10. The automated food preparation system of claim 1 wherein a plurality of first food engaging forks and a plurality of second food engaging forks are disposed within the housing and releasably attachable to the carrier of the grasping system.

11. The automated food preparation system of claim 10 further comprising a toasting station, wherein the toasting station is structurally configured to receive the first food engaging fork and the second food engaging fork when positioned in a first open configuration.

12. The automated food preparation system of claim 1 further comprising a spread applying station, including a spread dispensing tube having at least one opening, wherein the carrier can be positioned relative to the spread applying station in an orientation wherein the at least one opening can be oriented proximate one of the first food engaging fork and the second food engaging fork in the first open configuration.

13. An automated food preparation station comprising:
   one of a food placement and a food pickup station providing at least one of ingress into and egress from a housing;
   a cutting station assembly, having a cutting blade, the cutting station being positioned within the housing; and
   a grasping system within the housing, the grasping system further including,
   a first food engaging fork having a central body and a plurality of fork prongs extending from the central body;
   a second food engaging fork having a central body and a plurality of fork prongs extending from the central body; and
   a carrier, the carrier including a first fork coupling and a second fork coupling, the first fork coupling and the second fork coupling structurally configured to move together with the carrier, with at least one of the first fork coupling and the second fork coupling being able to pivot relative to the other of the first fork coupling and the second fork coupling;
   wherein the carrier is configured to translate across the cutting station assembly, with the cutting station assembly having a cutting blade, wherein in a second closed configuration, the carrier translates across the cutting station so that the cutting blade proceeds between the first food engaging fork and the second food engaging fork.

14. The automated food preparation station of claim 13 wherein the cutting blade is positionable so as to be substantially parallel to each of the fork prongs of the first food engaging fork and the second food engaging fork.

15. The automated food preparation station of claim 14 wherein the cutting blade rotates about an axis that is fixed to the housing, with the carrier configured to move relative thereto.

16. A grasping system within a housing of an automated food preparation station, the grasping system comprising:
- a first food engaging fork having a central body and a plurality of fork prongs extending from the central body;
- a second food engaging fork having a central body and a plurality of fork prongs extending from the central body; and
- a carrier, the carrier including a first fork coupling and a second fork coupling, the first fork coupling and the second fork coupling structurally configured to move together with the carrier, with at least one of the first fork coupling and the second fork coupling being able to pivot relative to the other of the first fork coupling and the second fork coupling;
- wherein the carrier further includes a fork pivoting assembly, defining a fork pivot axis, with the first fork coupling being fixedly coupled to the fork pivot axis, so that the first fork coupling can pivot about the fork pivot axis
- wherein the first fork coupling is structurally configured to pivot between a first orientation wherein the first food engaging fork and the second food engaging fork are positioned in a side by side configuration defining a first open configuration and a second orientation wherein the first food engaging fork and the second food engaging fork are positioned in a stacked orientation defining a second closed configuration.

17. The grasping system of claim 16 wherein one of the first fork coupling and the second fork coupling is removably fixed to the carrier.

\* \* \* \* \*